(12) United States Patent
Shima

(10) Patent No.: US 7,692,805 B2
(45) Date of Patent: Apr. 6, 2010

(54) PRINT JOB DISTRIBUTION PROCESSING

(75) Inventor: Toshihiro Shima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 891 days.

(21) Appl. No.: 11/510,659

(22) Filed: Aug. 28, 2006

(65) Prior Publication Data

US 2007/0046989 A1    Mar. 1, 2007

(30) Foreign Application Priority Data

Aug. 30, 2005    (JP)    ............................. 2005-248733

(51) Int. Cl.
     *G06F 15/00*    (2006.01)
(52) U.S. Cl. .................... 358/1.14; 358/1.13; 358/1.15; 358/1.18; 709/203; 709/209; 709/226
(58) Field of Classification Search ....... 358/1.13–1.15, 358/1.18; 709/203, 209, 226
See application file for complete search history.

(56) References Cited

U.S. PATENT DOCUMENTS

| | | | | |
|---|---|---|---|---|
| 5,287,194 | A * | 2/1994 | Lobiondo .................... | 358/296 |
| 5,802,260 | A * | 9/1998 | Shimakawa et al. ......... | 358/1.15 |
| 6,657,741 | B1 * | 12/2003 | Barry et al. ................ | 358/1.15 |
| 7,161,707 | B1 * | 1/2007 | Fukushima et al. .......... | 358/1.6 |
| 2003/0038962 | A1 * | 2/2003 | Shimada .................... | 358/1.15 |
| 2005/0134909 | A1 * | 6/2005 | Shima et al. ............... | 358/1.15 |
| 2005/0270565 | A1 * | 12/2005 | Shima et al. ............... | 358/1.15 |

FOREIGN PATENT DOCUMENTS

| | | |
|---|---|---|
| JP | 2002-268850 A | 9/2002 |
| JP | 2004-181647 A | 7/2004 |

\* cited by examiner

*Primary Examiner*—Chan S Park
(74) *Attorney, Agent, or Firm*—Sughrue Mion, PLLC

(57) ABSTRACT

To provide a technology for, if a first distribution destination printing device cannot continue printing according to a print job, causing a second distribution destination printing device to execute an unexecuted print job without using a server. The first distribution destination printing device, used for a printing system, includes a print job processing module that acquires a distributed print job supplied from a distribution source device and gives the distributed print job to a printing execution module. The print job processing module acquires, from the distribution source device, device identification information for identifying the second distribution destination printing device among a plurality of distribution destination printing devices, the second distribution destination printing device belonging to the same group as the first distribution destination printing device. The print job processing module, if the first distribution printing device cannot continue printing according to the distributed print job, generates the unexecuted print job, and supplies the unexecuted print job to the second distribution destination printing device.

18 Claims, 16 Drawing Sheets

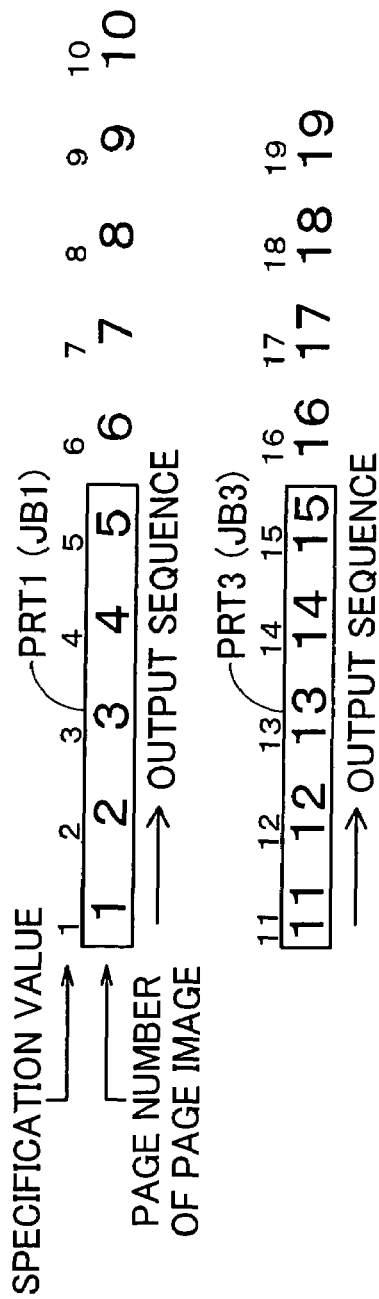
Fig.8(A) ASCENDING ORDER
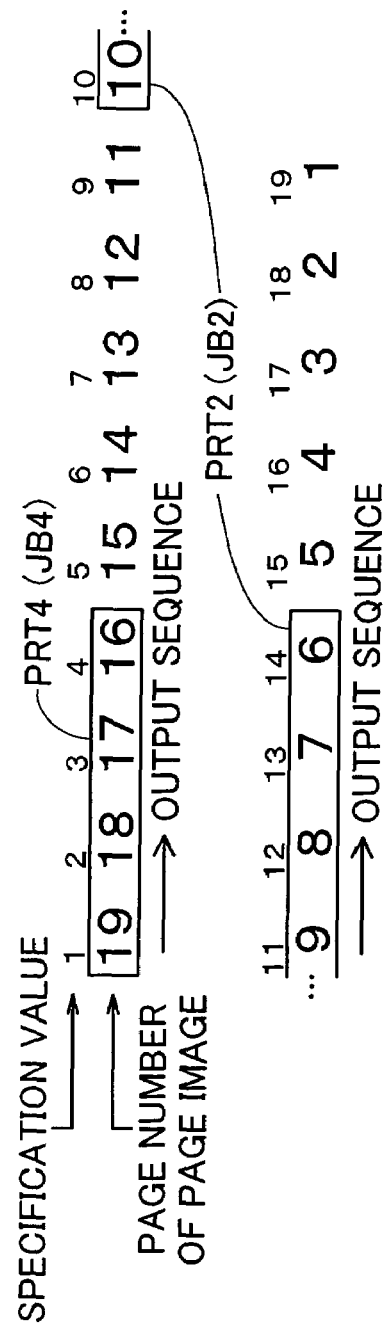
Fig.8(B) DESCENDING ORDER

Fig.10(A) DT5(PRT1→PRT2)
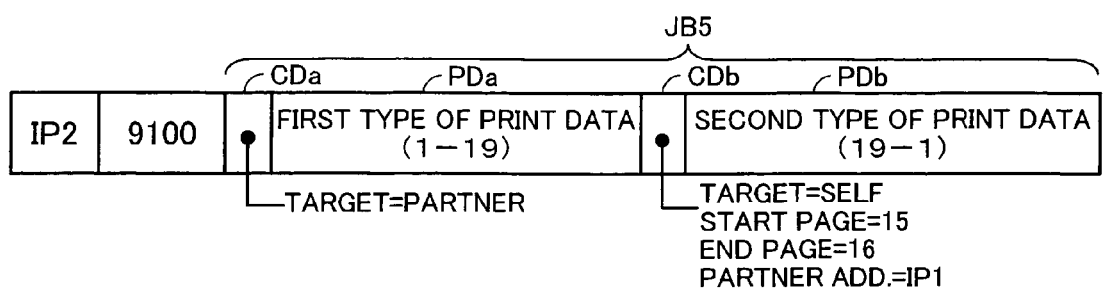
Fig.10(B) DT6(PRT2→PRT1)
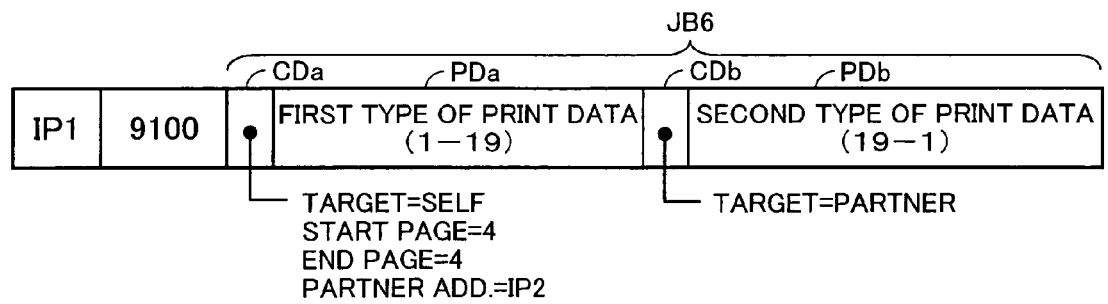

Fig.13(A) DT5' (PRT1→PRT2)
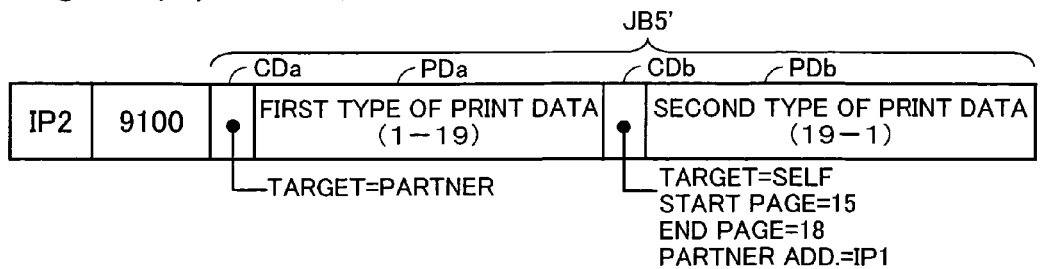
Fig.13(B) DT6' (PRT2→PRT1)
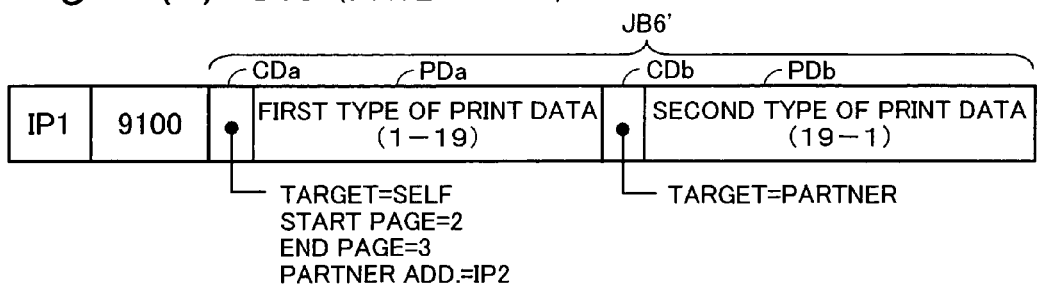
Fig.14(A)
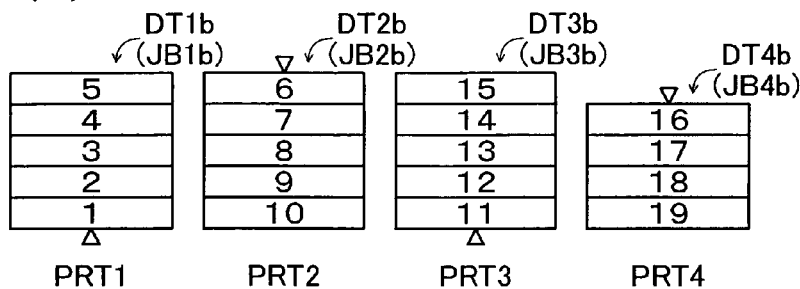
Fig.14(B)
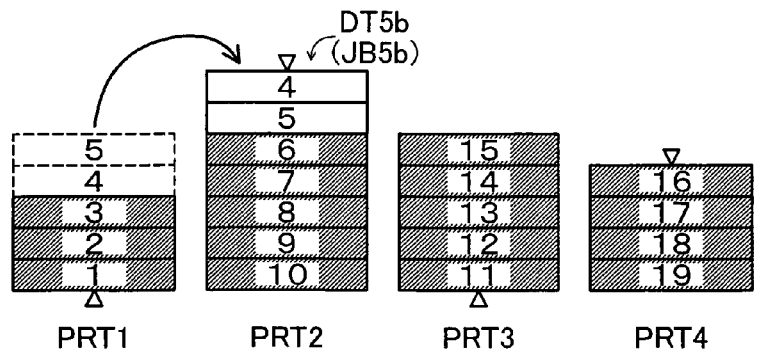

PRINT JOB DISTRIBUTION PROCESSING

CROSS REFERENCE

The present application is based on, and claims priority from, Japanese Applications No. 2005-248733 filed Aug. 30, 2005, the disclosures of which are herein incorporated by reference.

BACKGROUND

1. Technical Field

The present invention relates to distribution printing technology for distributing a print job to a plurality of printers.

2. Related Art

In a distribution printing system, normally, a server and a plurality of printers are connected via a network, and the server distributes a print job received from a computer to a plurality of distribution destination printers.

Note that, JP2002-268850A discloses that if execution of the job is stopped at one of a pair of printers due to a paper jam, the server recreates and sends the part of the job not yet output to the other of the printer pair.

However, the part of the job not yet output is recreated by the server, so there is a problem that a server is required.

SUMMARY

An object of the invention is to provide a technology for, if a first distribution destination printing device cannot continue printing according to a print job, causing a second distribution destination printing device to execute an unexecuted print job without using a server.

According to a first aspect of the invention, there is provided a first apparatus that is a first distribution destination printing device, used for a printing system comprising a distribution source device that executes distribution processing for distributing an original print job and a plurality of distribution destination printing devices that execute printing according to a plurality of distributed print jobs supplied from the distribution source device respectively. The first distribution destination printing device comprises: a printing execution module that executes printing; and a print job processing module that acquires a first distributed print job supplied from the distribution source device and gives the first distributed print job to the printing execution module. The print job processing module comprises: a device information acquiring module that acquires, from the distribution source device, device identification information for identifying a second distribution destination printing device among the plurality of distribution destination printing devices, the second distribution destination printing device belonging to the same group as the first distribution destination printing device; and an unexecuted print job generating module that, if the first distribution printing device cannot continue printing according to the first distributed print job, generates a first unexecuted print job that is a print job for unexecuted of the first distributed print job, and supplies the first unexecuted print job to the second distribution destination printing device identified by the device identification information.

If the first distribution destination printing device cannot continue printing according to the first distributed print job, the first distribution destination printing device can generate the first unexecuted print job and supply the first unexecuted print job to the second distribution destination printing device identified by the device identification information. As a result, if the first distribution destination printing device cannot continue printing according to the first distributed print job, it is possible to cause the second distribution destination printing device to execute the first unexecuted print job without using the distribution source device having a function as a server.

In the above apparatus, it is preferred that if the print job processing module acquires a second unexecuted print job that is a print job for unexecuted of a second distributed print job, the second distributed print job being supplied from the distribution source device to the second distribution destination printing device, the print job processing module gives the second unexecuted print job to the printing execution module.

In this arrangement, the first distribution destination printing device, when acquiring the second unexecuted print job from the second distribution destination printing device, can execute printing according to the second unexecuted print job.

In the above apparatus, the original print job may require executing of printing of a plurality of pages. The first distributed print job may require execution of printing of pages of a first part among the plurality of pages. The second distributed print job may require execution of printing of pages of a second part among the plurality of pages, the second part being different from the first part. The first unexecuted print job may require execution of printing of an unprinted page among the pages of the first part.

In the above apparatus, it is preferred that the first distributed print job requires execution of printing of the pages of the first part, and also requires outputting of each printed medium, for which a page of the first part is printed, in a first state in which a predetermined surface of each printed medium faces a first direction and each printed medium is aligned in ascending order. It is preferred that the second distributed print job requires execution of printing of the pages of the second part subsequent to the pages of the first part, and also requires outputting of each printed medium, for which a page of the second part is printed, in a second state in which a predetermined surface of each printed medium faces a second direction different from the first direction and each printed medium is aligned in descending order. It is also preferred that the first unexecuted print job requires execution of printing of the unprinted page immediately before the pages of the second part, among the pages of the first part, and also requires outputting of each printed medium, for which the unprinted page is printed, in the second state.

In this arrangement, it is possible to cause the first and second distribution destination printing devices to output each printed medium in a state with the page continuity maintained In the above apparatus, each of the distributed print jobs may include: a first type of print data that represents images for the plurality of pages aligned in ascending order; a second type of print data that represents images for the plurality of pages aligned in descending order; and print data specification information that indicates one of the two types of print data to be used by each of the distribution destination printing devices. The first unexecuted print job may be generated by modifying the print data specification information included in the first distributed print job.

Alternatively, in the above apparatus, each of the distributed print jobs may include: print data that represents images for the plurality of pages aligned in a predetermined order; and output order specification information that indicates an output order of each printed medium printed by each of the distribution destination printing devices. The first unexecuted print job may be generated by modifying the output order specification information included in the first distributed print job.

In the above apparatus, each of the distributed print jobs preferably includes print data that represents images of the plurality of pages. The second distributed print job is preferably deleted in the second distribution destination printing device, if the printing according to the second distributed print job is completed. It is preferred that the unexecuted print job generating module supplies to the second distribution destination printing device the first unexecuted print job that is generated using the first distributed print job and includes the print data.

In this arrangement, even after the second distributed print job is deleted at the second distribution destination printing device, the unexecuted print job generating module of the first distribution destination printing device can cause the second distribution destination printing device to execute printing according to the first unexecuted print job Alternatively, in the above apparatus, each of the distributed print jobs preferably includes print data that represents images of the plurality of pages. The second distributed print job is preferably held in the second distribution destination printing device, until the printing according to the first distributed print job is completed by the first distribution destination printing device. It is preferred that the unexecuted print job generating module supplies to the second distribution destination printing device the first unexecuted print job that is generated using the first distributed print job and does not include the print data.

In this way, if the second distributed destination print job is held at the second distribution destination printing device until the printing is completed at the first distribution destination printing device, the unexecuted print job generating module of the first distribution destination printing device can supply the first unexecuted print job that does not contain print data to the second distribution destination printing device, so it is possible to make the size of the first unexecuted print job quite small.

In the above apparatus, the device identification information may be included in the first distributed print job.

In the above apparatus, the group may be constituted by the first distribution destination printing device and the second distribution destination printing device.

In the above apparatus, the first distribution destination printing device may include the distribution source device.

In this arrangement, it is possible not to provide an independent distribution source device having a function as a server.

According to a second aspect of the invention, there is provided a second apparatus that is a printing system. The printing system comprises: the plurality of distribution destination printing devices that include the first distribution destination printing device described above; and the distribution source device.

Note that the present invention can be realized with other aspects as well. For example, the third apparatus of the present invention is a distribution source device. The distribution source device comprises: a distribution processing module that generates a plurality of distributed print jobs from an original print job; and supplies the plurality of distributed print jobs to a plurality of distribution destination printing devices, wherein the distribution processing module comprises: a device identification information supply module that sets a group containing at least two distribution destination printing devices among the plurality of distribution destination printing devices, and that supplies device identification information to a first distribution destination printing device belonging to the group, the device identification information identifying a second distribution destination printing device belonging to the group.

It should be noted that the present invention may be actualized by a diversity of applications such as a distribution destination printing device, a method for processing in the device, a printing system, a method for processing in the device included in the system, computer programs that attain these methods or functions of these apparatuses, recording media in which such computer programs are recorded, and data signals that include such computer programs and are embodied in carrier waves.

These and other objects, features, aspects, and advantages of the present invention will become more apparent from the following detailed description of the preferred embodiments with the accompanying drawings.

BRIEF DESCRIPTION OF THE DRAWINGS

FIGS. 8(A) and 8(B) show relationship between page numbers and specification values for page images;

FIGS. 10(A) and 10(B) show specific contents of communication data DT5 and DT6 according to the first embodiment;

FIGS. 13(A) and 13(B) show specific contents of communication data DT5' and DT6' according to the modified example of the first embodiment;

FIGS. 14(A) and 4(B) show summary of printing process according to the second embodiment;

DESCRIPTION OF THE PREFERRED EMBODIMENT

Embodiments of the present invention are discussed below based on examples in the following order.

A. First embodiment:
  A-1. Distribution printing system configuration:
    A-1-1. Personal Computer Configuration:

A-1-2. Printer Configuration:
A-2. Printing Process:
A-2-1. Printing Process Summary:
A-2-2. Communication Data:
A-2-3. Distribution source printer Processing:
A-2-4. Distribution destination printer Processing:
A-3. Modified Example of First Embodiment:
A-3-1. Printing Process Summary:
A-3-2. Communication Data:
A-3-3. Distribution source printer Processing:
A-3-4. Distribution destination printer Processing:

B. Second Embodiment:
B-1. Printing Process Summary:
B-2. Communication Data:
B-3. Distribution source printer Processing:
B-4. Distribution destination printer Processing:

A. First Embodiment

A-1. Distribution Printing System Configuration

Figure 1:
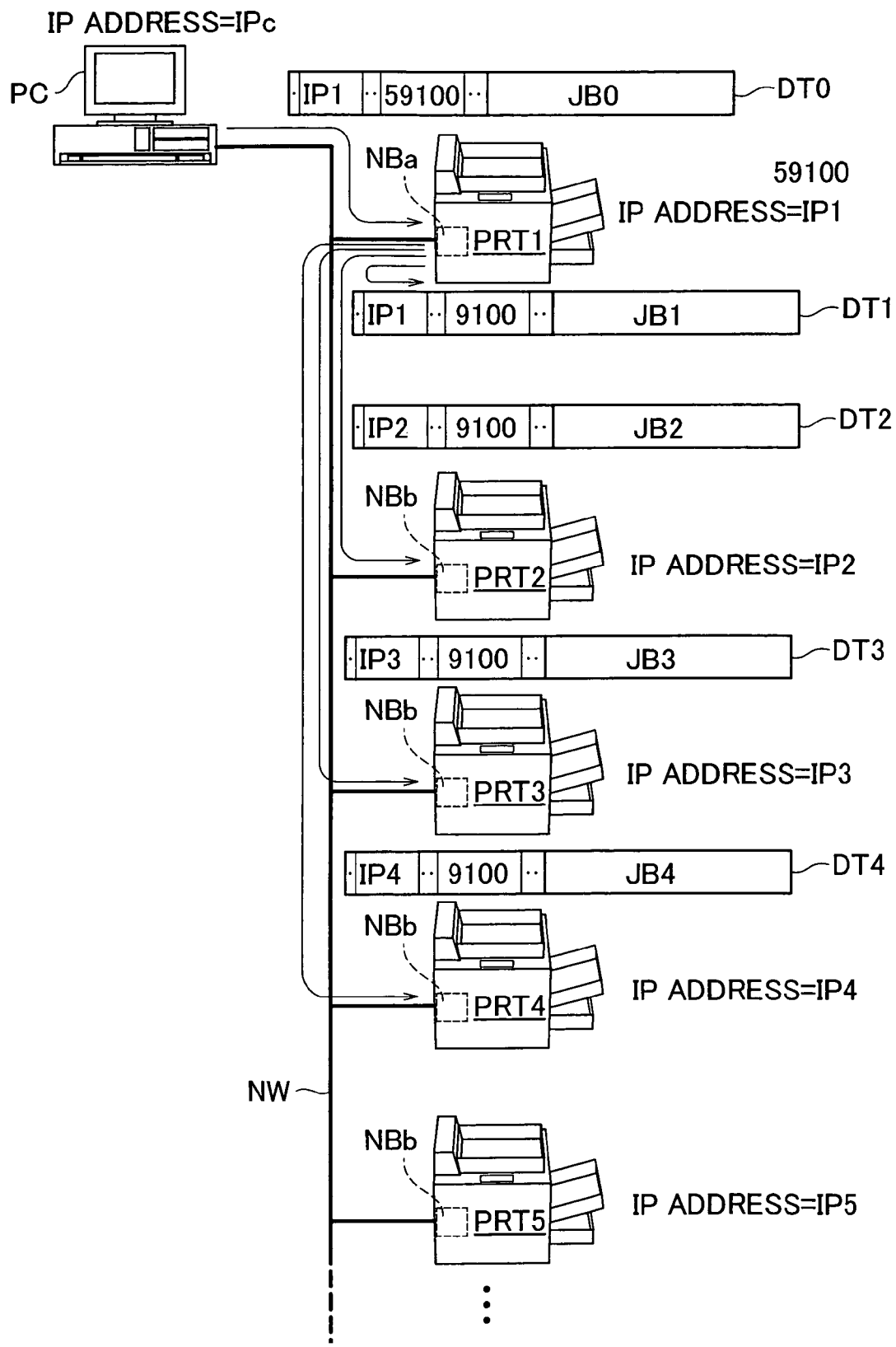
FIG. 1 shows a distribution printing system.

FIG. 1 shows a distribution printing system. The distribution printing system includes a personal computer PC and a plurality of printers PRT1-PRT5, and each machine is mutually connected via a local area network (LAN) NW.

Communication between each machine is realized using the TCP/IP protocol, and an IP address is allocated in advance to each machine. In FIG. 1, the IP address IPc is allocated to the computer PC, and the IP addresses IP1-IP5 are respectively allocated to the printers PRT1-PRT5. Note that the IP address is actually allocated to a node such as a network board connected to the network NW.

In FIG. 1, a first type of network board NBa is incorporated in the first printer PRT1, and a second type of network board NBb is incorporated in the other printers PR2-PR5. Each network board NBa, NBb is an interface for exchanging communication data via the network NW. In particular, the first type of network board NBa has the function of executing distribution processing for distributing a print job subject to distribution given from the computer PC to a plurality of printers. A printer in which the first type of network board NBa is incorporated can function as a distribution source printer and also can function as a distribution destination printer. On the other hand, a printer in which the second type of network board NBb is incorporated can function only as a distribution destination printer.

In FIG. 1, shown is the exchange of communication data DT0-DT4 when a print job subject to distribution given to the distribution source printer PRT1 from the computer PC is distributed to the four distribution destination printers PRT1-PRT4.

Figure 2:
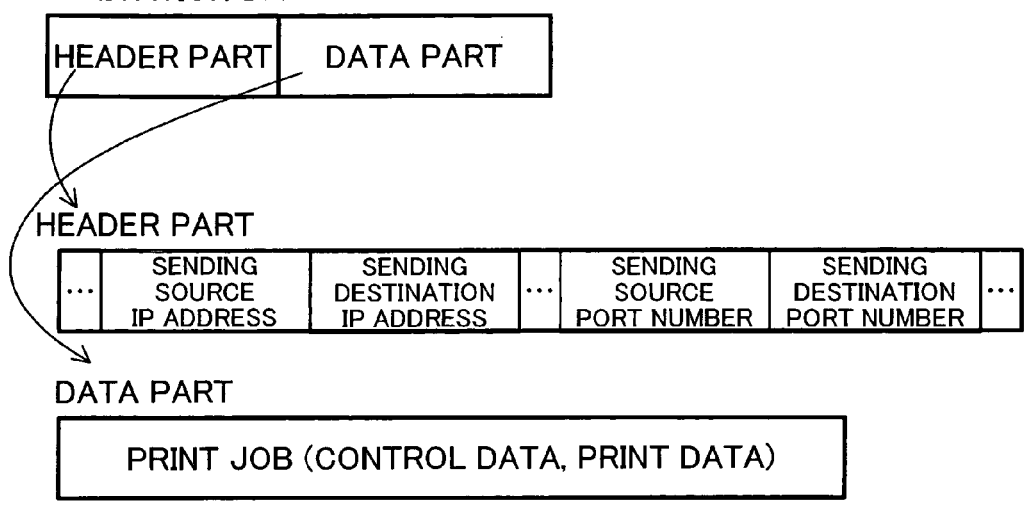
FIG. 2 typically shows a communication data configuration.

FIG. 2 typically shows a communication data configuration. As shown in the drawing, the communication data contains a header part and a data part.

The header part includes a sending source IP address, a sending destination IP address, a sending source port number, and a sending destination port number. The sending source IP address indicates an IP address of the sending source machine that sends the communication data, and the sending destination IP address indicates an IP address of the sending destination machine that receives the communication data. The sending source port number indicates a port number that identifies software within the sending source machine, and the sending destination port number indicates a port number that identifies software within the sending destination machine.

The data part includes a print job. The print job, as is described later, contains control data and print data. The print data is data that represents images of a plurality of pages, and is described using a page description language such as ESC/page and Postscript. The control data includes print job attributes and commands that is necessary when executing printing using the print data, and the control data is described using a predetermined job control language (with this embodiment, Epson Job Language).

In FIG. 1, the computer PC first sends the communication data DT0 containing the print job JB0 subject to distribution to the distribution source printer PRT1. The communication data DT0 (FIG. 1) includes the sending destination IP address "IP1" and the sending destination port number "59100".

Note that in this embodiment, nonprocedural protocol is used as the printing protocol. With nonprocedural protocol, normally, "9100" is allocated as the port number. In this embodiment, when sending the print job from the computer PC to the distribution source printer PRT1, instead of "9100", "59100" is used as the port number.

When the first network board NBa of the distribution source printer PRT1 receives the communication data DT0, it transfers the print job JB0 subject to distribution to the software waiting at the port number "59100". Distribution processing software for distributing print jobs subject to distribution is waiting at the port number "59100". In FIG. 1, the distribution processing software sets the four printers PRT1-PRT4 including its own printer PRT1 as the distribution destination printers. Then, the distribution processing software generates communication data DT1-DT4 respectively containing the distributed print jobs JB1-JB4, and sends these to the distribution destination printers PRT1-PRT4. In the communication data DT1-DT4, "IP1", "IP2", "IP3", and "IP4" are respectively set as the sending destination IP addresses, and "9100" is set as the sending destination port number.

When the second type of network board NBb of the distribution destination printer PRT2 receives the communication data DT2, it transfers the distributed job JB2 to the software waiting at the port number "9100". As described previously, the port number "9100" is a port number normally allocated to the nonprocedural protocol that is the printing protocol, and job processing software for processing the received print jobs is waiting at the port number "9100". The job processing software transfers the distributed print job JB2 to a controller inside the printer PR2, and as a result, printing is executed at the printer PRT2 according to the print job JB2. Note that at the other distribution destination printers PRT1, PRT3, and PRT4 as well, the same as at the distribution destination printer PRT2, printing is executed according to the distributed print job.

In this embodiment, the computer PC gives the print job JB0 requiring printing of a plurality of pages to the distribution source printer PRT1. Then, the distribution source printer PRT1 gives the print jobs JB1-JB4 requiring printing of part of the pages mutually different from each among the plurality of pages to the distribution destination printers PRT1-PRT4. As a result, images for the plurality of pages are printed by the four distribution destination printers. Further, in this embodiment, when one of the distribution destination printers cannot continue printing, another distribution destination printer continues printing instead of the one distribution destination printer.

Note that hereafter, the print job subject to distribution (JB0) is also called simply "original job," and the distributed print jobs subject to execution (JB1-JB4) are also called simply "distributed jobs."

Figure 3:
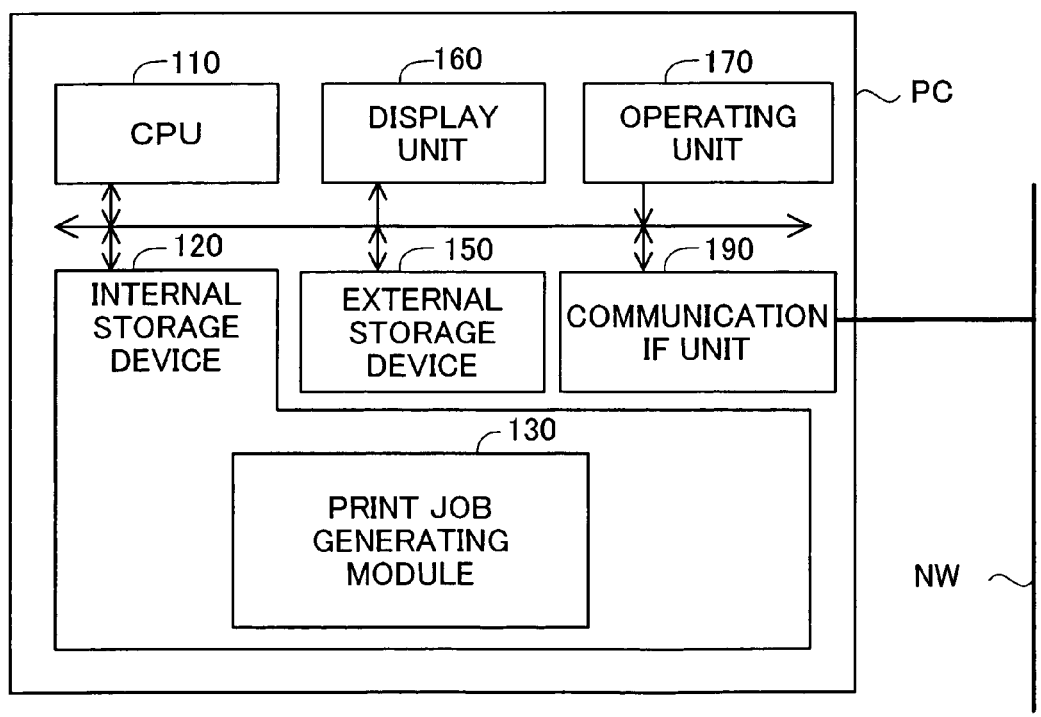
FIG. 3 shows an internal structure of a computer PC of FIG. 1.

A-1-1. Personal Computer Configuration:

FIG. 3 shows an internal structure of the computer PC of FIG. 1. The computer PC has a CPU 110, an internal storage device 120 such as ROM or RAM, an external storage device 150, a display unit 160, an operating unit 170 such as a mouse or keyboard, and a communication interface unit (communication IF unit) 190.

In the internal storage device 120A, computer program (printer driver) that functions as the print job generating module 130 is stored. The print job generating module 130 generates a print job subject to distribution (that is, original job) according to instructions from the user. Then, the print job generating module 130 supplies the original job to the distribution source printer PRT1 via the communication IF unit 190. The function of the print job generating module 130 is realized by the CPU 110 executing the computer program (printer driver). The computer program is provided in a format recorded on a computer readable recording medium such as a CD-ROM.

Figure 4:
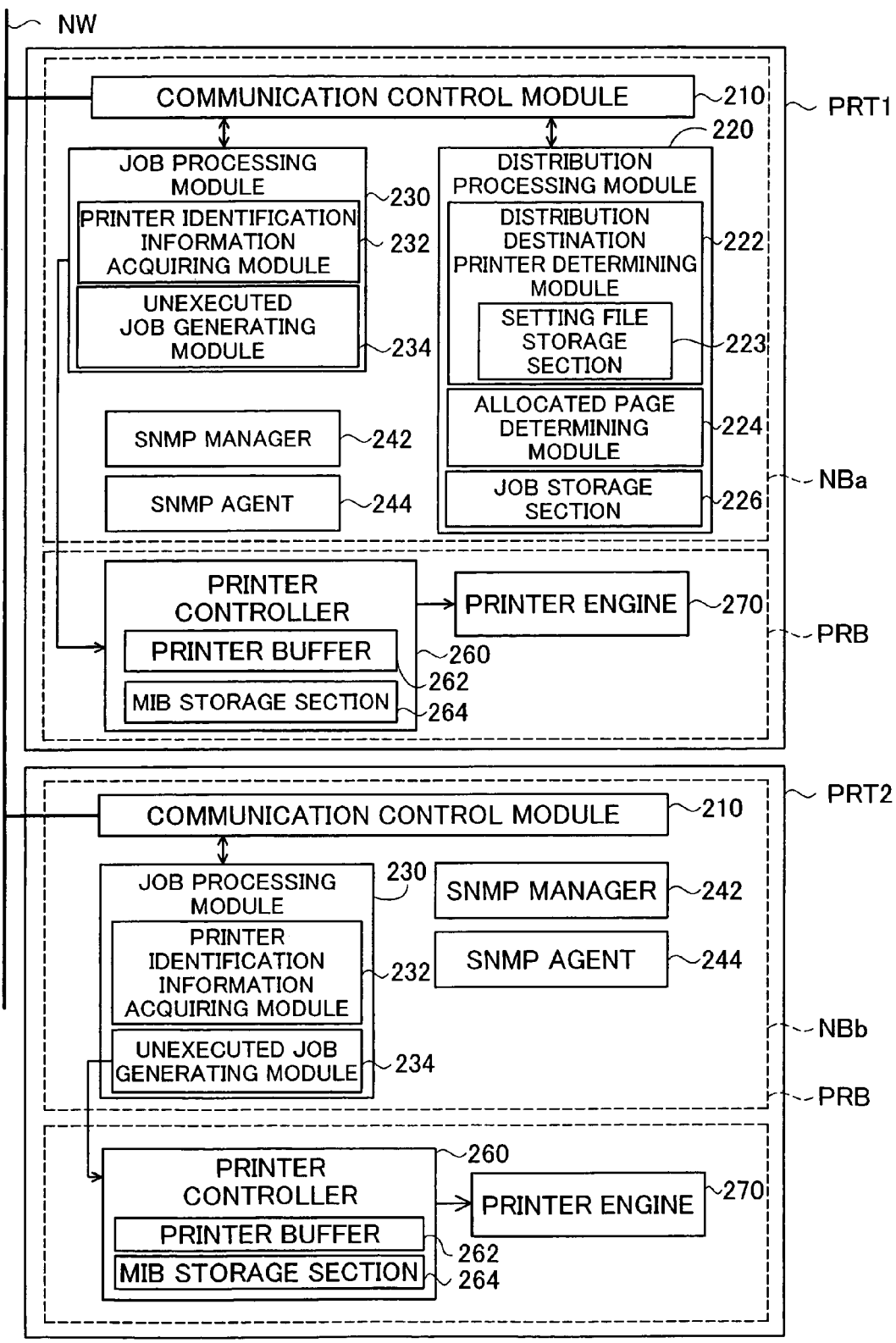
FIG. 4 shows internal structures of first and second printers PRT1 and PRT2 of FIG. 1.

A-1-2. Printer Configuration:

FIG. 4 shows internal structures of the first and second printers PRT1 and PRT2 of FIG. 1.

The first printer PRT1 has a printer main unit PRB and the previously described first type of network board NBa.

The printer main unit PRB includes a printer controller 260 and a printer engine 270. The printer engine 270 is a mechanical part that executes printing images. The printer controller 260 cause the printer engine 270 to execute printing according to the distributed print job subject to execution (that is, distributed job) given from the network board NBa. The printer controller 260 includes a printer buffer 262 for storing distributed jobs, and an MIB storage section 264 for storing its own printer status information called an MIB (Management Information Base).

The network board NBa is a computer that includes a CPU and a memory such as ROM or RAM. The network board NBa includes a communication control module 210, a distribution processing module 220, and a job processing module 230. The functions of the distribution processing module 220 are executed by the previously described distribution processing software, and the functions of the job processing module 230 are executed by the previously described job processing software. If the communication data includes the sending destination port number "59100", the distribution processing module 220 operates, and if the communication data includes the sending destination port number "9100", the job processing module 230 operates. Note that each software component (computer program) is provided in a format recorded on a computer readable recording medium such as a CD-ROM.

The communication control module 210 performs communication with external devices via a network. For example, the communication control module 210 detects the sending destination IP address and the sending destination port number contained in the received communication data. Further, the communication control module 210 gives the sending destination IP address and the sending destination port number to the communication data to be sent.

The distribution processing module 220 includes a distribution destination printer determining module 222, an allocated page determining module 224, and a job storage section 226, and has the function of executing the distribution processing for generating a plurality of distributed jobs from the original job given from the computer PC, and for supplying the plurality of distributed jobs to the plurality of distribution destination printers.

The distribution destination printer determining module 222 determines a plurality of printers to be actually used as the distributed destination from among the many printers connected to the network. Specifically, the distribution destination printer determining module 222 uses a setting file stored in a setting file storage section 223 and determines a plurality of distribution destination printers. In the setting file, an IP address of a printer than can be used as the distributed destination is registered. As the IP address of this printer, an IP address of a printer of the same model as the distribution source printer is registered, and in this embodiment, the IP address of the distribution source printer itself is also registered. Note that the setting file is set in advance by the network administrator or the like.

In particular, in this embodiment, the distribution destination printer determining module 222 selects an even number of distribution destination printers and sets pairs for every two printers. As will be described later, in this embodiment, if one of the distribution destination printers constituting the pair cannot continue printing, the other distribution destination printer constituting the pair (that is, partner printer) carries out the unexecuted printing.

The allocated page determining module 224 determines allocated pages to be printed by each distribution destination printer. Specifically, when the distribution processing module 220 uses an original job requiring printing of a plurality of pages and generates a plurality of distributed jobs supplied to the plurality of distribution destination printers, the allocated page determining module 224 allocates a part of the plurality of pages to each distribution destination printer. The parts allocated to the distribution destination printers are mutually different.

In the job storage section 226, the original job received from the computer PC and distributed jobs each of which are to be supplied to each distribution destination printer are stored.

The job processing module 230 acquires the distributed job supplied from the distribution source printer (more specifically, the distribution processing module 220) and has the function of transferring the distributed job to the printer controller 260.

Further, the job processing module 230 has the function of acquiring an unexecuted job from the partner printer if the partner printer (distribution destination printer) cannot continue printing, and of transferring the unexecuted job to the printer controller 260. Furthermore, the job processing module 230 includes a printer identification information acquiring module 232 and an unexecuted job generating module 234, and has the function of supplying an unexecuted job to the partner printer if its own distribution destination printer cannot continue printing. Note that the unexecuted job is a print job requiring printing of an unexecuted part of the distributed job given to the distribution destination printer.

The printer identification information acquiring module 232 acquires printer identification information that identifies a partner printer (the other distribution destination printer) from the distribution source printer. In this embodiment, the IP address is used as the printer identification information, and the IP address is included in the distributed job supplied from the distribution source printer.

The unexecuted job generating module 234, if its own distribution destination printer cannot continue printing according to the distributed job, generates an unexecuted job that is an unexecuted print job of at least part of the distributed job, and supplies the unexecuted job to the partner printer (the other distribution destination printer) identified by the printer identification information.

The second printer PRT2 includes the printer main unit PRB and the previously described second type of network board NBb. Note that the printer main unit PRB is the same as the printer main unit PRB of the first printer PRT1. Also, the second type of network board NBb is almost the same as the first type of network board NBa, but it does not include the distribution processing module 220, and it does include the communication control module 210 and the job processing module 230.

As shown in FIG. 3, the first and second types of network boards NBa, NBb further includes an SNMP manger module 242 and an SNMP agent module 244. The SNMP manager module 242 has the function of acquiring the status information from the SNMP agent module 244 of each printer according to instruction from the distribution processing module 220 or the job processing module 230. At this time, the SNMP agent module 244 reads the printer status information from the MIB storage section 264.

The other three printers PRT3-PRT5 are configured in the same way as the second printer PRT2.

Note that as can be understood from the explanation above, the distribution destination printer having the network board NBa or NBb of this embodiment corresponds to a distribution destination printing device of the present invention. Also, the distribution processing module 220 provided in the first type of network board NBa corresponds to a distribution source device of the present invention, and the job processing module 230 provided in the network board NBa or NBb corresponds to a print job processing module of the present invention. Furthermore, the printer controller 260 and the printer engine 270 of this embodiment correspond to a printing execution module of the present invention.

A-2. Printing Process

Figure 5A:
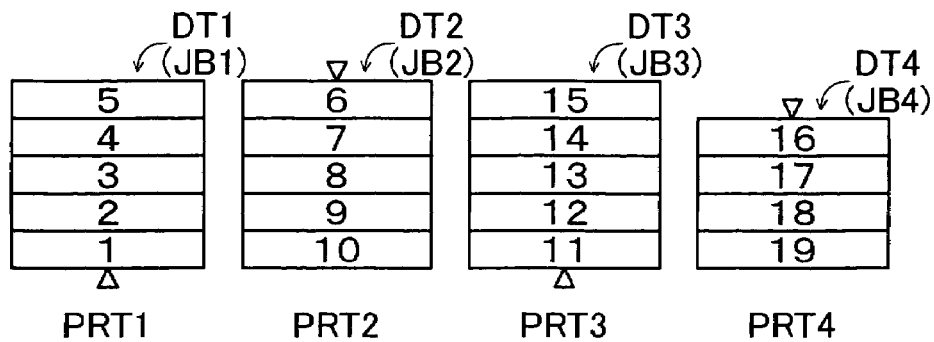
FIGS. 5(A)-5(C) show summary of printing process according to the first embodiment.
Figure 5B:
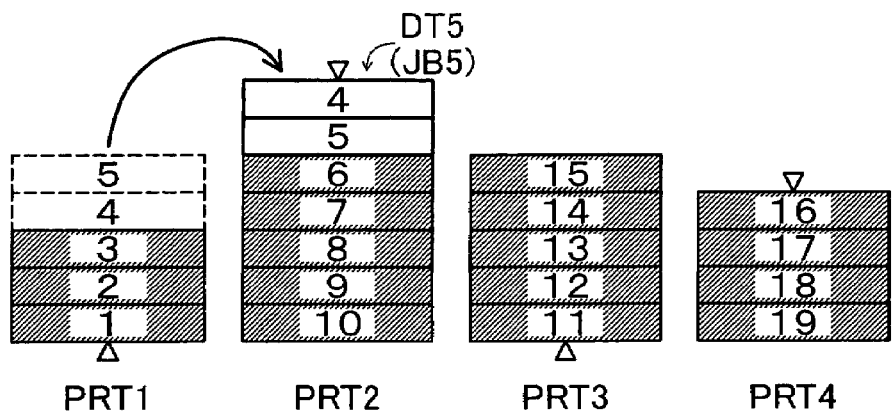
Figure 5C:
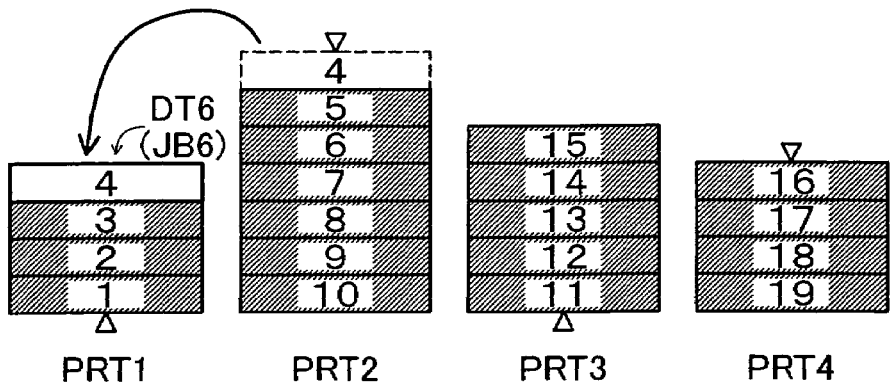

A-2-1. Printing Process Summary:

FIGS. 5(A)-5(C) show summary of printing process according to the first embodiment. In this embodiment, the computer PC generates an original job JB0 that requires execution of printing images of 19 pages, and supplies communication data DT0 including the original job JB0 to the distribution source printer PRT1. The distribution source printer PRT1 generates mutually different distributed jobs JB1-JB4 such that the 19 page images are printed by the four distribution destination printers PRT1-PRT4, and supplies communication data DT1-DT4 including the distributed jobs JB1-JB4 to the distribution destination printers PRT1-PRT4, respectively.

As shown in FIG. 5(A), the first distributed job JB1 requires execution of the printing of the images of the 1st to 5th pages, and also requires outputting of each printed paper in a first state. The first state means a state in which a front surface of each printed paper (in this embodiment, the same as the printed surface) is facing downward on a paper ejection tray, and each printed paper is aligned in ascending order (in other words, the order for which the page numbers sequentially increase). Note that in FIG. 5(A), the front surface of the printed paper is indicated with a triangle Δ mark. The second distributed job JB2 requires execution of printing of the images of the 6th to 10th pages, and also requires outputting of each printed paper in a second state. The second state means a state in which a front surface of each printed paper is facing upward on the paper ejection tray, and each printed paper is aligned in descending order (in other words, the order for which the page numbers sequentially decrease). The third distributed job JB3 is almost the same as the first distributed job JB1. The third distributed job JB3 requires execution of printing of the images of the 11th to 15th pages and also requires outputting of each printed paper in the first state. The fourth distributed job JB4 is almost the same as the second distributed job JB2. The fourth distributed job JB4 requires execution of printing of the images of the 16th to 19th pages and also requires outputting of each printed paper in the second state.

If each distribution destination printer PRT1-PRT4 executes printing according to each distributed job, the user can easily obtain the 19 printed papers for which the page continuity is maintained. Specifically, the user stacks printed papers such that a back surface of the fifth printed paper on which the 5th page is printed by the first printer PRT1 faces a front surface of the fifth printed paper on which the 6th page is printed by the second printer PRT2. Similarly, the user stacks printed papers such that a back surface of the first printed paper on which the 10th page is printed by the second printer PRT2 faces a front surface of the first printed paper on which the 11th page is printed by the third printer PRT3, and such that a back surface of the fifth printed paper on which the 15th page is printed by the third printer PRT3 and a front page of the fourth printed paper on which the 16th page is printed by the fourth printer PRT4. By doing this, the user can collect the printed papers without realigning the printed papers in page sequence.

Incidentally, due to lack of paper or the like, it occurs that one of the printers cannot continue printing. In this embodiment, printing is continued instead by the other distribution destination printer.

In FIG. 5(B), the three printers PRT2-PRT4 complete the printing according to the distributed jobs JB2-JB4, but the first printer PRT1 does not complete the printing according to the distributed job JB1. Specifically, the first printer PRT1 finishes only the printing of the images of the 1st to 3rd pages, and it does not finish the printing of the images of the 4th and 5th pages due to lack of paper. Note that in the drawing, there are hatch marks on the printed paper.

At this time, the first distribution destination printer PRT1 supplies communication data DT5 including a first unexecuted job JB5 to the second distribution destination printer PRT2, and requests the second distribution destination printer PRT2 to execute the printing of the images of the 4th and 5th pages. However, to maintain the page continuity of the printed papers, the first unexecuted job JB5, almost the same as the second distributed job JB2, requires execution of printing of images of the 4th and 5th pages and also requires outputting of each printed paper in the second state.

If the second distribution destination printer PRT2 executes printing according to the first unexecuted job JB5, the user can obtain the 19 printed papers with the page continuity maintained.

In this embodiment, furthermore, it is assumed that the second distribution destination printer PR2 cannot continue printing due to lack of paper or the like.

In FIG. 5(C), the second distribution destination printer PRT2 finishes only the printing of the image of the 5th page, and due to lack of paper, the printing of the image of the 4th page is not finished. Note that, at this time, it is assumed that paper has already been supplemented to the first distribution destination printer PRT1.

At this time, the second distribution destination printer PRT2 supplies communication data DT6 including a second unexecuted job JB6 to the first distribution destination printer PRT1, and requests the first distribution destination printer PRT1 to execute printing of the image of the 4th page. However, to maintain the page continuity of the printed papers, the second unexecuted job JB6, almost the same as with the first distributed job JB1, requires execution of printing of the image of the 4th page and also requires outputting of the one printed paper in the first state.

If the first distribution destination printer PRT1 executes printing according to the second unexecuted job JB6, the user can obtain the 19 printed papers with the page continuity maintained.

As described above, if the printing of the unprinted pages is performed suitably by the other distribution destination printer, even in cases where any of the printers cannot continue printing, it is possible to complete printing of all the pages rapidly and with the page continuity maintained.

As shown in FIGS. 5(A)-5(C), in this embodiment, if one of the first distribution destination printer PRT1 and the second distribution destination printer PRT2 cannot continue printing, the other continues printing for the unprinted pages. Similarly, if one of the third distribution destination printer PRT3 and the fourth distribution destination printer PRT4 cannot continue printing, the other continues printing for the unprinted pages. Namely, in this embodiment, the pair of the first distribution destination printer PRT1 and the second distribution destination printer PRT2 mutually carry out printing in place of each other, and the pair of the third distribution destination printer PRT3 and the fourth distribution destination printer PRT4 mutually carry out printing in place of each other.

A-2-2. Communication Data:

FIGS. 6(A)-6(E) show specific contents of the communication data DT0-DT4 according to the first embodiment. FIGS. 6(A)-6(E) respectively show the communication data DT0-DT4. Note that in FIGS. 6(A)-6(E), the sending destination IP address and the sending destination port number are represented in the header part.

As shown in FIGS. 6(A)-6(E), in this embodiment, the print job of the data part includes two sets of job data. The first set of job data includes first control data CDa and first type of print data PDa representing a plurality of page images aligned in ascending order. The second set of job data includes second control data CDb and second type of print data PDb representing a plurality of page images aligned in descending order.

Each control data includes various information such as "SUBMISSION", "TARGET", "ORDER", "TOTAL PAGES", "START PAGE", "END PAGE", "PRINT FACE", "PARTNER ADD.", and the like. Note that in FIGS. 6(A)-6(E), the "SUBMISSION", "ORDER", "TOTAL PAGES", and "PRINT FACE" information is shown as only being contained in the original job JB0 (FIG. 6(A)), but it is also similarly contained in distributed jobs JB1-JB4 (FIGS. 6(B)-6(E)). Also, as shown in FIGS. 6(A)-6(E), the "START PAGE", "END PAGE", and "PARTNER ADD." information is contained only in jobs JB1-JB4 (FIGS. 6(B)-6(E)).

"SUBMISSION" information: This information indicates an identifier given when a print job is created by the print job generating module 130 of the computer PC. By identifying the "SUBMISSION" information, the user can confirm the processing status of the corresponding print job at the computer PC. Note that in the first control data CDa and the second control data CDb, the same identifier is described as the "SUBMISSION" information.

"TARGET" information: This information indicates one set of job data to be used by the distribution destination printer. The distribution destination printer uses the job data including the control data in which "TARGET=SELF" is described and executes printing. Note that the distribution destination printer ignores the job data including the control data in which "TARGET=PARTNER" is described. In the first control data CDa, one of the items "TARGET=SELF" and "TARGET=PARTNER" is described, and the other is described in the second control data CDb.

"ORDER" information: This information indicates an alignment order of the plurality of page images represented by the print data contained in each set of job data. "ORDER=ASCENDING" indicates that the plurality of page images are aligned in ascending order, and "ORDER=DESCENDING" indicates that the plurality of page images are aligned in descending order. Note that "ORDER=ASCENDING" is described in the first control data CDa, and "ORDER=DESCENDING" is described in the second control data CDb.

"TOTAL PAGES" information: This information indicates a total page count of the plurality of page images represented by the print data contained in each set of job data. Note that the same "TOTAL PAGES" value is described in the first control data CDa and the second control data CDb.

"START PAGE" information: This information indicates a printing start page among the plurality of page images represented by the print data contained in each set of job data. Note that the "START PAGE" information is added by the distribution source printer, and is contained only in the one control data in which "TARGET=SELF" is described.

"END PAGE" information: This information indicates a printing end page among the plurality of page images represented by the print data contained in each set of job data. Note that the "END PAGE" information is added by the distribution source printer, and is only contained in the one control data in which "TARGET=SELF" is described.

"PRINT FACE" information: This information indicates an output format of the printed papers. "PRINT FACE=DOWN" indicates that the front surface of each printed paper should be output facing downward on the paper ejection tray. "PRINT FACE=UP" indicates that the front surface of each printed paper should be output facing upward on the paper ejection tray. Note that "PRINT FACE=DOWN" is described in the first control data CDa and "PRINT FACE=UP" is described in the second control data CDb.

"PARTNER ADD." information: This information indicates the IP address of the partner printer (the other distribution destination printer) of the distribution destination printer identified by the sending destination IP address. Note that "PARTNER ADD." is information added by the distribution source printer, and is contained only in the one control data in which "TARGET=SELF" is described.

Figure 6A:
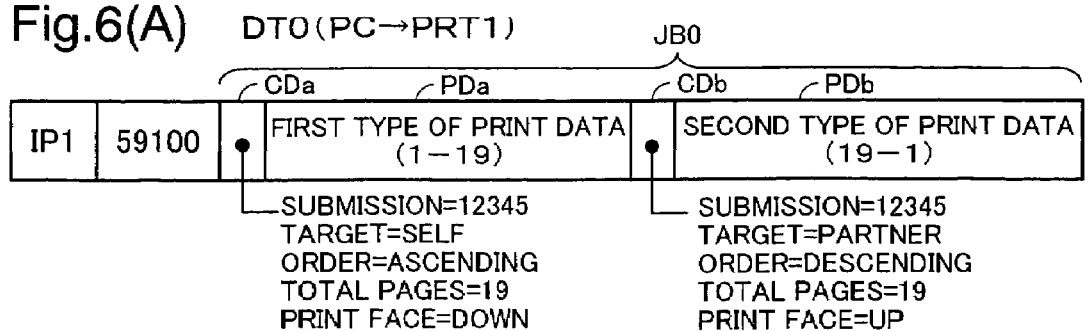
FIGS. 6(A)-6(E) show specific contents of communication data DT0-DT4 according to the first embodiment.
Figure 6B:
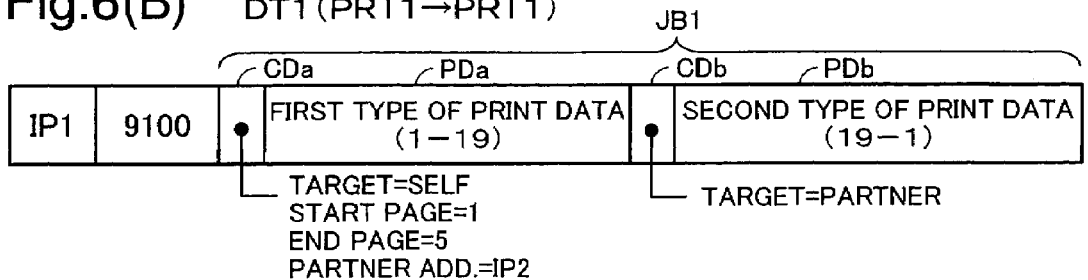
Figure 6C:
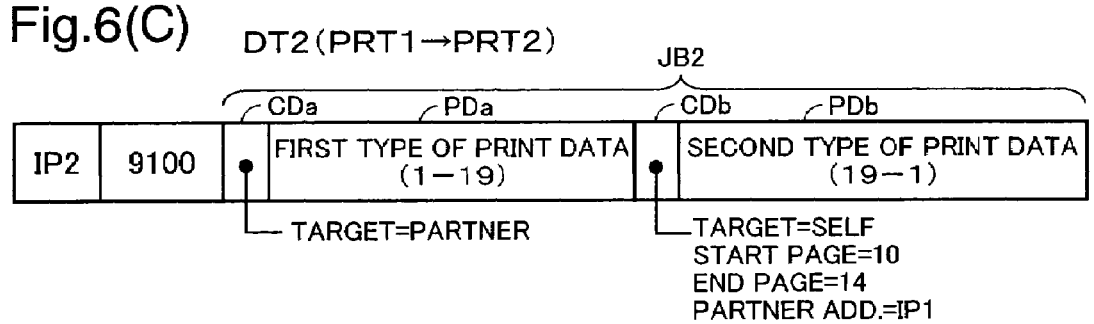
Figure 6D:
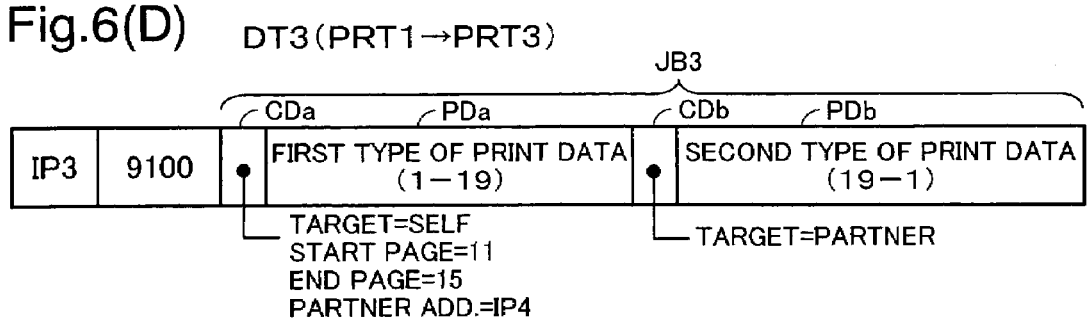

The first and third distribution destination printers PRT1 and PRT3 use the first set of job data containing "TARGET=SELF" among the two sets of job data contained in the distributed jobs JB1 and JB3 shown in FIGS. 6(B) and 6(D), respectively. The first set of job data contains the first control data CDa in which "PRINT FACE=DOWN" is described and the first type of print data PDa representing the plurality of page images aligned in ascending order. Because of this, as shown in FIGS. 5(A)-5(C), the first and third printers PRT1 and PRT3 can output each printed paper in a state (first state) that the front surface of each printed paper is facing downward on the paper ejection tray and each printed paper is aligned in ascending order.

Figure 6E:
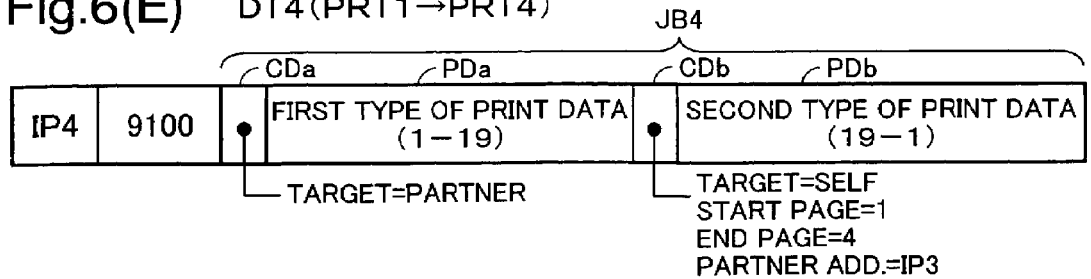

Also, the second and fourth distribution destination printers PRT2 and PRT4 use the second set of job data containing "TARGET=SELF" among the two sets of job data contained in the distributed jobs JB2 and JB4 shown in FIGS. 6(C) and 6(E), respectively. The second set of job data contains the second control data CDb in which "PRINT FACE=UP" is described and the second type of print data PDb representing the plurality of page images aligned in descending order. Because of this, as shown in FIGS. 5(A)-5(C), the second and fourth printers PRT2 and PRT4 can output each printed paper in a state (second state) that the front surface of each printed paper is facing upward on the paper ejection tray and each printed paper is aligned in descending order.

Note that the "TARGET" information of this embodiment correlates to the print data specification information of the present invention.

Figure 7:
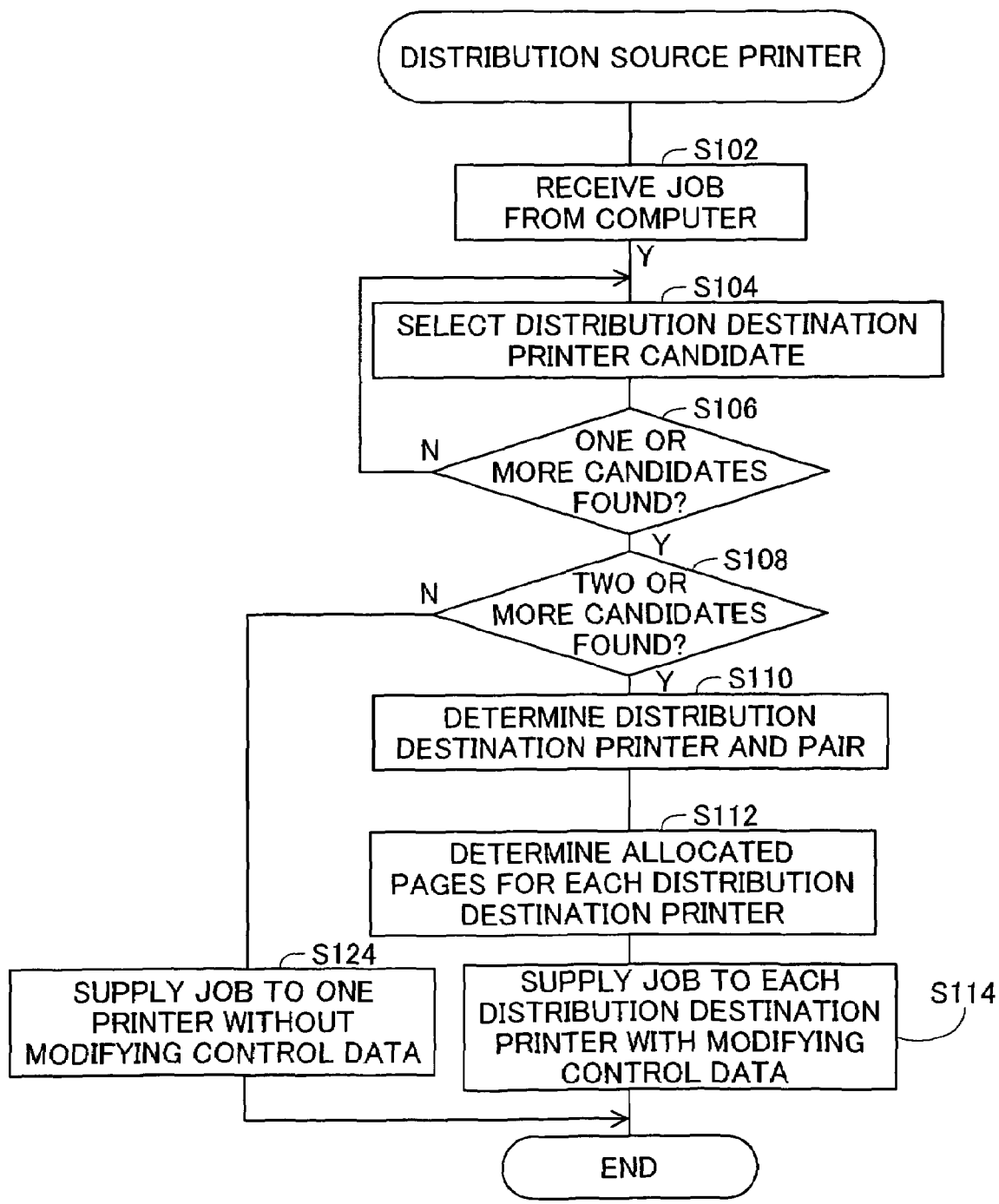
FIG. 7 is a flow chart showing processing contents of a distribution source printer.

A-2-3. Distribution Source Printer Processing:

FIG. 7 is a flow chart showing the processing contents of the distribution source printer. Note that the processing of FIG. 7 is executed by the distribution processing module 220 of the distribution source printer PRT1.

At step S102, the distribution processing module 220 receives the communication data DT0 (FIG. 6(A)) containing the original job JB0 subject to distribution from the computer PC.

At step S104, the distribution destination printer determining module 222 selects candidates for distribution destination printers. Specifically, the distribution destination printer determining module 222 controls the SNMP manager module 242 and requires sending of the status information to each printer registered in the setting file. At this time, the SNMP agent module 244 of each of the above printers reads the status information from the MIB storage section 264, and returns this information to the SNMP manager module 242 of the distribution source printer PRT1. The distribution destination printer determining module 222 selects, based on the status information of each printer, the distribution destination printer candidates that can execute printing immediately. Note that the distribution destination printer candidates that can be used immediately are, for example, printers for which an error such as paper jam or lack of paper has not occurred.

At step S106, the distribution destination printer determining module 222 judges whether or not one or more distribution destination printer candidates are found. If one or more distribution destination printer candidates are found, the processing proceeds to step S108. On the other hand, if no distribution destination printer candidate is found, the processing returns to step S104.

At step S108, the distribution destination printer determining module 222 judges whether two or more distribution destination printer candidates are found. If two or more distribution destination printer candidates are found, the processing proceeds to step S110. On the other hand, if only one distribution destination printer candidate is found, the processing proceeds to step S124 described later.

At step S110, the distribution destination printer determining module 222 determines distribution destination printers to actually be used from among the two or more distribution destination printer candidates, and also determines a distribution destination printer pair.

If the number of distribution destination printer candidates is N, the distribution destination printer pair count R and the number of actually used distribution destination printers n are represented by formula (1). Note that "int( )" is a function for obtaining the integer part of the value in parentheses.

$$R = int(N/2)$$

$$n = 2 \cdot R \quad (1)$$

For example, if the distribution destination printer candidate count N is 5, the pair count R is 2, and the actually used distribution destination printer count n is 4.

After the distribution destination printer count n is determined, the distribution destination printer determining module 222 determines an even number of distribution destination printers among the plurality of distribution destination printer candidates, and also determines a distribution destination printer pair. In this embodiment, among the N distribution destination printer candidates, the n candidates for which a high priority level is set in the setting file are determined for the distribution destination printers. Also, among the n distribution destination printers, every two printers for which a higher priority level is set are determined in the same pair. Note that if the priority level of the printer placed at a location closer to the location at which the distribution source printer PRT1 is placed is set higher, it is possible to make the moving distance relatively small when the user collects printed paper.

In this embodiment, the four printers PRT1-PRT4 are determined as the distribution destination printers. Also, the first and second printers PRT1 and PRT2 are set as the first pair, and the third and fourth printers PRT3 and PRT4 are set as the second pair.

At step S112, the allocated page determining module 224 determines the allocated pages to be printed by each distribution destination printer based on the total page count ("TOTAL PAGES" information in FIG. 6(A)) contained in the original job JB0.

If the total page count is Q, the page count P(m) to be printed by the m-th printer PRTm is represented by formula (2).

$$P(m) = int\left(\frac{Q + (n-m)}{n}\right) \quad (2)$$

In this embodiment, the total page count Q is 19, so P(1)=5, P(2)=5, P(3)=5, and P(4)=4 are obtained. In this way, according to formula (2), it is possible to allocate the page count almost evenly to each distribution destination printer, and as a result, it is possible to set the printing completion time for each distribution destination printer to be almost the same.

The allocated start page S(m) to be printed by the m-th printer PRTm equals to a value obtained by adding 1 to the total sum of the page count to be printed by the first through (m−1)th printers, so this is represented by formula (3). However, the allocated start page S(1) to be printed by the first printer PRT1 is set to 1.

$$S(1) = 1 \quad (3)$$

$$S(m) = \sum_{i=1}^{m-1} P(i) + 1 (2 \le m \le n)$$

In this embodiment, S(1)=1, S(2)=6, S(3)=11, and S(4)=16 are obtained.

Also, the allocated end page E(m) to be printed by the m-th printer PRTm equals to a value of the sum total of the page count to be printed by the first through the m-th printers, so this is represented by formula (4).

$$E(m) = \sum_{i=1}^{m} P(i) \qquad (4)$$

In this embodiment, E(1)=5, E(2)=10, E(3)=15, and E(4)=19 are obtained.

At step S114, the distribution processing module 220 modifies the control data CDa and CDb of the original job JB0 stored in the job storage section 226 and generates the distributed jobs JB1-JB4, and supplies the communication data DT1-DT4 containing jobs JB1-JB4 (FIGS. 6(B)-6(E)) to the distribution destination printers PRT1-PRT4, respectively.

As described previously, each distributed job includes a first type of print data PDa representing the plurality of page images aligned in ascending order and a second type of print data PDb representing the plurality of page images aligned in descending order. Then, if the pair number is x, the (2·x−1)th printers (in other words, the odd numbered printers) execute printing using the first type of print data PDa, and the (2·x)th printers (in other words, the even numbered printers) execute printing using the second type of print data PDb.

With the first type of print data PDa and the second type of print data PDb, the alignment order of the plurality of page images is different, so it is necessary to specify the printing start page and the printing end page value according to that order.

FIGS. 8(A) and 8(B) show the relationship between page numbers and specification values for page images. FIG. 8(A) shows the relationship between page numbers (#) and specification values for page images aligned in ascending order. FIG. 8(B) shows the relationship between page numbers (#) and specification values for page images aligned in descending order. As shown in FIG. 8(A), if the page images are aligned in ascending order, a page number (e.g. 5) and a specification value (e.g. 5) for a page image (e.g. fifth page image) always match. However, as shown in FIG. 8(B), if the page images are aligned in descending order, a page number (e.g. 5) and a specification value (e.g. 15) for a page image (e.g. fifth page image) are different.

As shown in FIG. 5(A), the first and third printers PRT1 and PRT3 output page images in ascending order using the first type of print data PDa. Because of this, in the first and third distributed jobs JB1 and JB3, the same value as the value of the allocated start page S is included as the specification value SP for the printing start page ("START PAGE" information of FIGS. 6(B) and 6(D)), and the same value as the value of the allocated end page E is included as the specification value EP for the printing end page ("END PAGE" information of FIGS. 6(B) and 6(D)) (see FIG. 8(A)). Specifically, in the first distributed job JB1, SP(1)=1 (1st page image) and EP(1)=5 (5th page image) are included. Similarly, in the third distributed job JB3, SP(3)=11 (11th page image) and EP(3)=15 (15th page image) are included.

On the other hand, as shown in FIG. 5(A), the second and fourth printers PRT2 and PRT4 output page images in descending order using the second type of print data PDb. Because of this, in the second and fourth distributed jobs JB2 and JB4, the value corresponding to the value of the allocated end page E needs to be included as the specification value SP for the printing start page, and the value corresponding to the value of the allocated start page S needs to be included as the specification value EP for the printing end page (see FIG. 8(B)). Specifically, in the second distributed job JB2, SP(2)=10 (10th page image) and EP(2)=14 (6th page image) need to be included. Similarly, in the fourth distributed job JB4, SP(4)=1 (19th page image) and EP(4)=4 (16th page image) need to be included.

As can be understood from the description above, the specification values SP and EP that should be included in the job given to the (2·x−1)th printer and the job given to the (2·x)th printer are respectively represented by formula (5).

$SP(2 \cdot x-1)=S(2 \cdot x-1)$ $EP(2 \cdot x-1)=E(2 \cdot x-1)$ $SP(2 \cdot x)=Q+1-E(2 \cdot x)$ $EP(2 \cdot x)=Q+1-S(2 \cdot x) \qquad (5)$ In this embodiment, the above values SP and EP are obtained based on formula (5). Then, as shown in FIGS. 6(B)-6(E), the distribution processing module 220 generates the distributed jobs JB1-JB4 to which the "START PAGE" information and the "END PAGE" information are added.

Also, at step S114 (FIG. 7), the distribution processing module 220 generates the distributed jobs JB1-JB4 for which the 'TARGET' information are modified and to which the "PARTNER ADD." information are added.

Specifically, the distribution processing module 220 sets "TARGET=SELF" for the first control data CDa of the distributed job given to the (2·x−1)th distribution destination printer, and sets "TARGET=PARTNER" for the second control data CDb. Also, the distribution processing module 220 sets "TARGET=PARTNER" for the first control data CDa of the distributed job given to the (2·x)th distribution destination printer, and sets "TARGET=SELF" for the second control data CDb.

In this embodiment, as shown in FIGS. 6(B)-6(E), "TARGET=SELF" is set for the first control data CDa of the first and third distributed jobs JB1 and JB3, and "TARGET=SELF" is set for the second control data CDb of the second and fourth distributed jobs JB2 and JB4.

Further, the distribution processing module 220 sets the IP address of the partner printer (the other distribution destination printer) constituting the pair as the "PARTNER ADD." information for one control data, in which "TARGET=SELF" is described, among the two control data CDa and CDb contained in the distributed job given to one of the distribution destination printers constituting the pair.

In this embodiment, as shown in FIGS. 6(B)-6(E), the IP address "IP2" of the second printer PRT2 is set in the first control data CDa of the first distributed job JB1, and the IP address "IP1" of the first printer PRT1 is set in the second control data CDb of the second distributed job JB2. Similarly, the IP address "IP4" of the fourth printer PRT4 is set in the first control data CDa of the third distributed job JB3, and the IP address "IP3" of the third printer PRT3 is set in the second control data CDb of the fourth distributed job JB4.

At step S114, as described above, jobs JB1-JB4 (FIGS. 6(B)-6(E)) suited for distribution destination printers are generated, and are supplied to distribution destination printers, respectively.

As described previously, if only one distribution destination printer candidate is found at step S108, the processing proceeds to step S124. At step S124, the distribution processing module 220, without modifying the control data CDa and CDb of the original job JB0, supplies the communication data including the original job JB0 to the sole printer (e.g. fifth printer PRT5) selected as the distribution destination printer candidate.

If the sole printer receives the communication data, it executes printing according to the original job JB0. Specifically, the sole printer executes printing using the first set of job data included in the original job JB0, the first set of job data containing the control data CDa in which is described "TARGET=SELF". However, the "START PAGE" information and "END PAGE" information are not contained in the first control data CDa of the original job JB0. Because of this, the distribution destination printer prints all the page images according to the first type of print data PDa.

Figure 9:
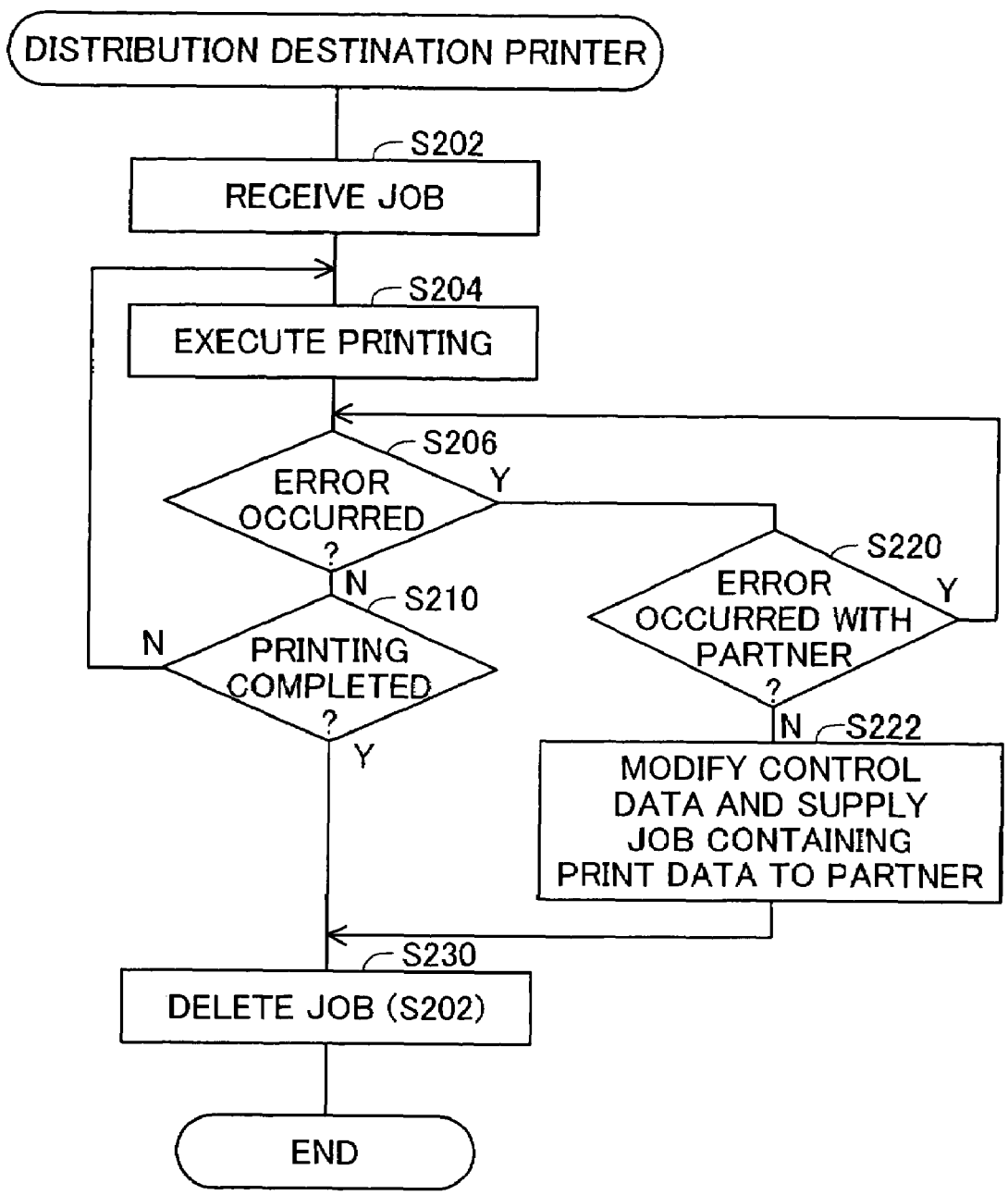
FIG. 9 is a flow chart showing processing contents of a distribution destination printer.

A-2-4. Distribution Destination Printer Processing:

FIG. 9 is a flow chart showing the processing contents of the distribution destination printer. Note that hereafter, the description will focus on one distribution destination printer.

At step S202, the job processing module 230 of the distribution destination printer being observed (e.g. PRT1) receives in sequence communication data (e.g. DT1) containing a distributed job (e.g. JB1) from the distribution source printer PRT1. At this time, the job processing module 230 transfers the distributed job to the printer controller 260, and the printer controller 260 stores the received distributed job in the printer buffer 262.

At step S204, the printer engine 270 of the distribution destination printer being observed (e.g. PRT1) executes printing in sequence according to the distributed job (e.g. JB1).

At step S206, the printer controller 260 of the distribution destination printer being observed (e.g. PRT1) judges whether or not an error has occurred with its own printer. Note that an error means a state of not being capable of continuing printing, for example paper jam or lack of paper. If an error has not occurred, the processing proceeds to step S210, and if an error has occurred, the processing proceeds to step S220 (described later).

At step S210, the printer controller 260 of the distribution destination printer being observed (e.g. PRT1) judges whether or not the printing is completed according to the distributed job (e.g. JB1). If printing is completed, the processing proceeds to step S230, and if printing is not completed, the processing returns to step S204.

At step S230, the printer controller 260 of the distribution destination printer being observed (e.g. PRT1) deletes the distributed job received at step S202 (e.g. JB1) from the printer buffer 262. In this way, printing according to the distributed job is completed at the distribution destination printer being observed.

As described previously, if an error has occurred at one's own printer (e.g. PRT1) at step S206, the processing proceeds to step S220.

At step S220, the job processing module 230 of the distribution destination printer being observed (e.g. PRT1) judges whether or not an error has occurred at the other distribution destination printer (e.g. PRT2) which is the partner. Specifically, the job processing module 230 controls the SNMP manager module 242 to require sending of the status information to the partner printer. At this time, the SNMP agent module 244 of the partner printer reads the status information from the MIB storage section 264, and returns this information to the SNMP manager module 242 of the distribution destination printer being observed. The job processing module 230 judges whether or not an error has occurred in the partner printer based on the status information of the partner printer. If an error has not occurred at the partner printer, the processing proceeds to step S222. On the other hand, if an error has occurred at the partner printer, the processing returns to step S206. Note that in the latter case, printing performance is stopped until the error on one of the printers constituting the pair is resolved.

At step S222, the unexecuted job generating module 234 of the distribution destination printer being observed (e.g. PRT1) modifies the control data of the distributed job (e.g. JB1) and generates the unexecuted job (e.g. JB5), and supplies communication data containing the unexecuted job (e.g. DT5) to the partner printer (e.g. PRT2). Specifically, the unexecuted job generating module 234 receives unprinted page information from the printer controller 260, and also receives the distributed job (e.g. JB1) stored inside the printer buffer 262. Then, the unexecuted job generating module 234 modifies the control data CDa and CDb of the distributed job (e.g. JB1) and generates the unexecuted job (e.g. JB5) that requires the printing of the unprinted pages. Note that when supplying of the unexecuted job to the partner printer (e.g. PRT2) is completed, the processing proceeds to step S230, and the distributed job received at step S202 (e.g. JB1) is deleted.

If the unexecuted job is supplied from one of the distribution destination printers constituting the pair to the other distribution destination printer (partner printer) as described above, the partner printer can process the unexecuted job according to the procedure in FIG. 9.

As can be understood from the description noted above, in the case of FIG. 5(B), at step S222, the first distribution destination printer PRT1 can generate the first unexecuted job JB5 using the first distributed job JB1, and can supply the first unexecuted job JB5 to the second distribution destination printer PRT2 which is the partner. Then, at step S202, the second distribution destination printer PRT2 can receive the first unexecuted job JB5, and can execute printing according to the unexecuted job JB5. In the case of FIG. 5(C), at step S222, the second distribution destination printer PRT2 can generate the second unexecuted job JB6 using the first unexecuted job JB5, and can supply the second unexecuted job JB6 to the first distribution destination printer PRT1 that is the partner. Then, at step S202, the first distribution destination printer PRT1 can receive the second unexecuted job JB6, and can execute printing according to the unexecuted job JB6.

FIGS. 10(A) and 10(B) show the specific contents of the communication data DT5 and DT6 according to the first embodiment. FIGS. 10(A) and 10(B) show the communication data DT5 and DT6, respectively.

As described previously, the first unexecuted job JB5 shown in FIG. 10(A) is generated by modifying the contents of the first control data CDa and the second control data CDb of the first distributed job JB1 (FIG. 6(B)). Specifically, the unexecuted job generating module 234 of the first distribution destination printer PRT1 changes "TARGET=SELF" of the first control data CDa of the first distributed job JB1 (FIG. 6(B)) to "TARGET=PARTNER", and deletes the "START PAGE", "END PAGE", and "PARTNER ADD." information. Also, the unexecuted job generating module 234 changes "TARGET=PARTNER" of the second control data CDb of the first distributed job JB1 to "TARGET=SELF", and adds "START PAGE=15", "END PAGE=16", and "PARTNER ADD.=IP1". Note that "PRINT FACE=UP" is described in the second control data CDb. As a result, as described with FIG. 5(B), the first unexecuted job JB5 is generated which requires execution of printing of the unprinted 4th and 5th page images (see FIG. 8(B)) and also requires outputting of each printed paper in the second state. Note that the specification value of the unprinted page is set according to formula (5).

Also, the second unexecuted job JB6 shown in FIG. 10(B) is generated by modifying the contents of the first control data CDa and the second control data CDb of the first unexecuted job JB5 (FIG. 10(A)). Specifically, the unexecuted job generating module 234 of the second distribution destination printer PRT2 changes "TARGET=PARTNER" of the first control data CDa of the first unexecuted job JB5 (FIG. 10(A)) to "TARGET=SELF", and adds "STRAIT PAGE=4", "END PAGE=4", and "PARTNER ADD.=IP2". Also, the unexecuted job generating module 234 changes "TARGET=SELF" of the second control data CDb of the first unexecuted job JB5 to "TARGET=PARTNER", and deletes the "START PAGE", "END PAGE", and "PARTNER ADD." information. Note that "PRINT FACE=DOWN" is described in the first control data CDa. As a result, as described with FIG. 5(C), the second unexecuted job JB6 is generated that requires execution of printing of the unprinted 4th page image (see FIG. 8(A)) and also requires outputting of each printed paper in the first state.

As described above, in this embodiment, if the first distribution destination printer PRT1 cannot continue printing according to the first distributed job JB1, the first distribution destination printer PRT1 generates the first unexecuted job JB5, and supplies the first unexecuted job JB5 to the second distribution destination printer PRT2 identified by the "PARTNER ADD." information contained in the first distributed job JB1. Then, the second distribution destination printer PRT2 acquires the first unexecuted job JB5 and executes printing according to the first unexecuted job JB5. In this way, in this embodiment, if the first distribution destination printer PRT1 cannot continue printing according to the first distributed job JB1, it is possible to have the first unexecuted job JB5 executed on the second distribution destination printer PRT2 without using the distribution processing module 220 having a function as a server.

In particular, in this embodiment, with each distribution destination printer, when printing is completed according to the given distributed job, the distributed job is deleted. However, in this embodiment, the first distribution destination printer PRT1 supplies the unexecuted job JB5 that contains the print data PDa and PDb to the second distribution destination printer PRT2, so the second distribution destination printer PRT2 can execute printing according to the unexecuted job JB5.

A-3. Modified Example of First Embodiment

A-3-1. Printing Process Summary

In the first embodiment, the case where a user requires that one page image is printed only on the front surface of the paper is described, but there is a case where a user requires that two page images are printed on the front surface and back surface of the paper. Also, if images are printed on both surfaces of the paper, there is a case where a user requires that a start page image of the plurality of page images is printed on the back surface of a start paper among the plurality of paper.

Figure 11A:
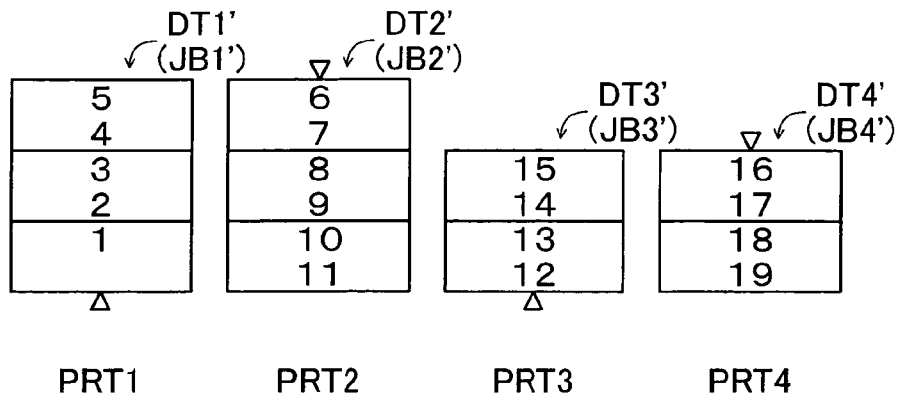
FIGS. 11(A)-11(C) show summary of printing process according to the modified example of the first embodiment.
Figure 11B:
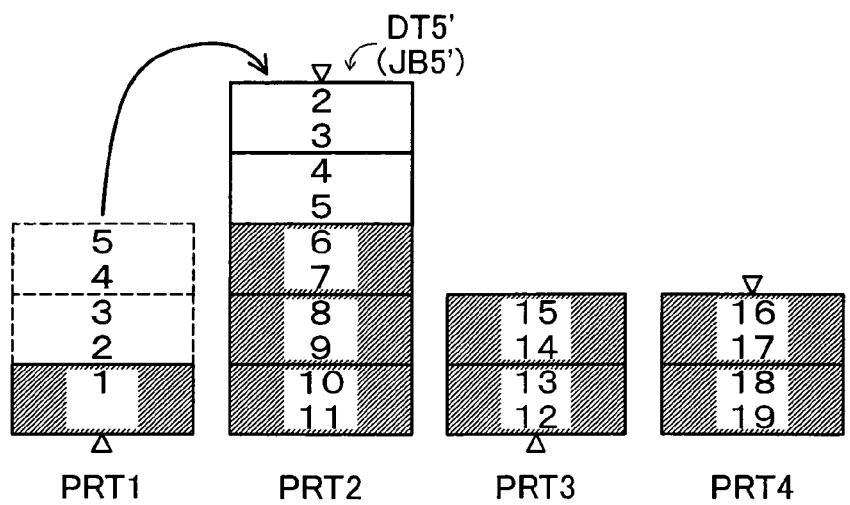
Figure 11C:
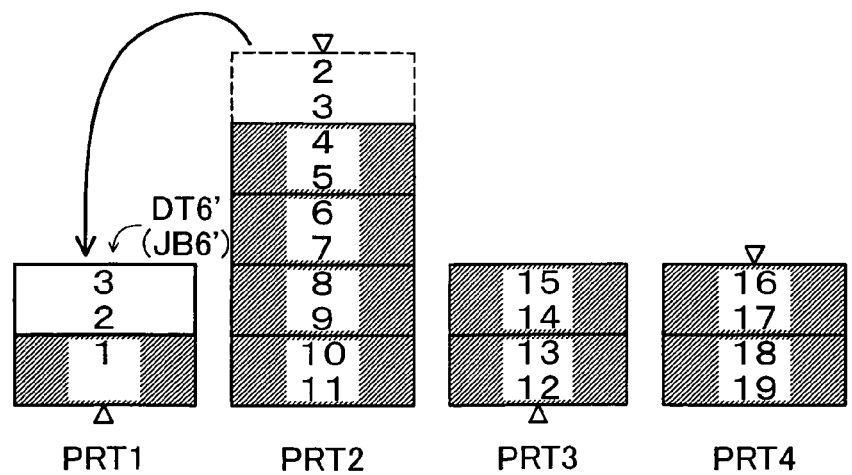

FIGS. 11(A)-11(C) show summary of the printing process according to the modified example of the first embodiment. In this example, similar to the first embodiment (FIGS. 5(A)-5(C)), the computer PC generates an original job JB0' that requires execution of printing of 19 pages of images, and supplies communication data DT0' containing the original job JB0' to the distribution source printer PRT1. The distribution source printer PRT1 generates mutually different distributed jobs JB1'-JB4' such that the 19 page images are printed by the four distribution destination printers PRT1-PRT4, and supplies communication data DT1'-DT4' including the distributed jobs JB1'-JB4' to the distribution destination printers PRT1-PRT4, respectively.

As shown in FIG. 11(A), the first distributed job JB1' requires execution of printing of the 1st to 5th page images, and also requires outputting of each printed paper in the previously described first state. The second distributed job JB2' requires execution of printing of the 6th to 11th page images and also requires outputting of each printed paper in the previously described second state. The third distributed job JB3', almost the same as the first distributed job JB1', requires execution of printing of the 12th to 15th page images and also requires outputting of each printed paper in the first state. The fourth distributed job JB4, almost the same as the second distributed job JB2', requires execution of printing of the 16th to 19th page images, and requires outputting of each printed paper in the second state.

However, in this example, as shown in FIG. 11(A), both surface printing is performed. Because of this, in this example, the front surface of each printed paper in the previously described first state and second state is the same as the surface on which the image of the smaller page number among the two page images printed on each printed paper is printed. Also, in this example, as shown in FIG. 11(A), on the front surface of the start paper, an image is not printed. Because of this, in this example, an even numbered page is printed on the front surface of each printed paper, and an odd numbered page is printed on the back surface.

In FIG. 11(B), similar to FIG. 5(B), the three printers PRT2-PRT4 have completed printing according to the distributed jobs JB2'-JB4', but the first printer PRT1 has not completed printing according to the distributed job JB1'. Specifically, the first printer PRT1 has finished only the printing of the 1st page image, and due to lack of paper, has not finished printing of the 2nd to 5th page images.

At this time, the first distribution destination printer PRT1 supplies communication data DT5' containing a first unexecuted job JB5' to the second distribution destination printer PRT2, and requests the second distribution destination printer PRT2 to execute the printing of the 2nd to 5th page images. However, to maintain the page continuity of the printed papers, the first unexecuted job JB5', almost the same as the second distributed job JB2', requires execution of printing of the 2nd to 5th page images, and also requires outputting of each printed paper in the second state.

In FIG. 11(C), similar to FIG. 5(C), the second distribution destination printer PRT2 has finished only printing of the 4th and 5th page images, and due to lack of paper, has not finished printing of the 2nd and 3rd page images. Note that, at this time, it is assumed that paper has already been supplemented to the first distribution destination printer PRT1.

At this time, the second distribution destination printer PRT2 supplies communication data DT6' containing a second unexecuted job JB6' to the first distribution destination printer PRT1, and requests the first distribution destination printer PRT1 to execute printing of the 2nd and 3rd page images. However, to maintain the page continuity of the printed papers, the second unexecuted job JB6', almost the same as the first distributed job JB1', requires execution of printing of the 2nd and 3rd page images, and also requires outputting of one printed paper in the first state.

In this example as well, if each printer PRT1-PRT4 executes printing according to each distributed job, the user can easily obtain the 10 printed papers for which the page continuity is maintained; similar to the first embodiment.

A-3-2. Commination Data

FIGS. 12(A)-12(E) show the specific contents of the communication data DT0'-DT4' according to the modified example of the first embodiment. FIGS. 12(A)-12(E) show the communication data DT0-DT4, respectively.

In this example, each communication data of the original job JB0'-JB4' includes almost the same information as that of the first embodiment (FIGS. 6(A)-6(E)), but "DX" and "FC" information are added. Note that in FIGS. 12(A)-12(E), the "DX" and "FC" information are shown only contained in the original job JB0' (FIG. 12(A)), but there are also contained in the same way in the distributed jobs JB1'-JB4' (FIGS. 12(B)-12(E)).

"DX" information: This information indicates whether or not both surface printing is executed. If "DX=ON", both surface printing is executed, and if "DX=OFF", similar to the first embodiment, one surface printing is executed without executing both surface printing. Note that the same "DX" information ("DX=ON" or "DX=OFF") is described in the first control data CDa and the second control data CDb.

"FX" information: This information indicates one of the surfaces of the start paper on which the start page image is printed, if both surface printing is executed. If "FC=FR", the start page image is printed on the front surface of the start paper, and if "FC=BK", the start page image is printed on the back surface of the start paper. Note that the same "FC" information ("FC=FR" or "FC=BK") is described in the first control data CDa and the second control data CDb.

In this example, as shown in FIGS. 11(A)-11(C), because both surface printing is executed and the start page image is printed on the back surface of the start paper, the settings are "DX=ON" and "FC=BK".

A-3-3. Distribution Source Printer Processing

In this example, the distribution source printer processing is executed by the same procedure as shown in FIG. 7. However, accompanying the execution of both surface printing, the specific processing contents of the steps S112 and S114 of FIG. 7 are modified as follows.

Figure 12A:
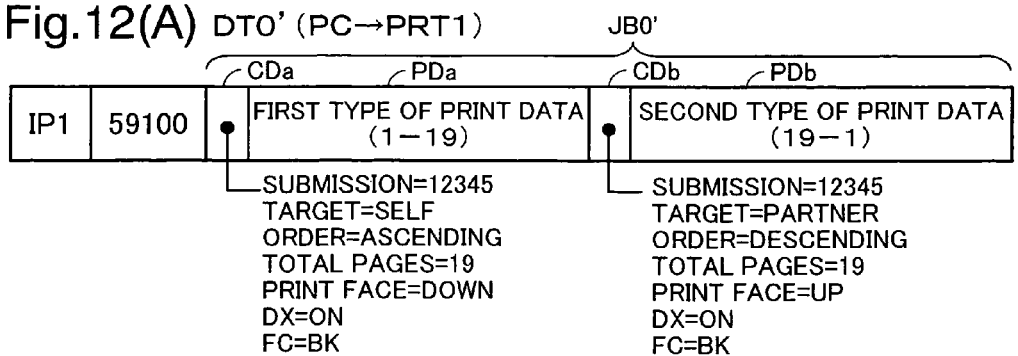
FIGS. 12(A)-12(E) show specific contents of communication data DT0'-DT4' according to the modified example of the first embodiment.

At step S112, the allocated page determining module 224 determines the allocated pages to be printed by each distribution destination printer based on the total page count contained in the original job JB0' ("TOTAL PAGES" information of FIG. 12(A)).

If the total page count is Q, the total count of papers used for printing Qv is represented by formula (6).

$$Qv = int\left(\frac{Q+b+1}{2}\right) \quad (6)$$

Here, b indicates whether or not the start page is printed on the front surface of the start paper. If the start page is printed on the front surface of the start paper (that is, if "FC=FR"), the setting is b=0, and if the start page is not printed on the front surface of the start paper (that is, if "FC=BK"), the setting is b=1.

In this example, the setting is "FC=BK", and the start page is not printed on the front surface of the start paper, so the setting is b=1. Therefore, the total paper count Qv becomes 10.

Also, the count Pv (m) of papers used with the m-th printer PRTm is represented by formula (7).

$$Pv(m) = int\left(\frac{Qv + (n-m)}{n}\right) \quad (7)$$

In this example, because the total paper count Qv is 10, Pv(1)=3, Pv(2)=3, Pv(3)=2, and PV(4)=2 are found.

Assuming that the start page is printed on the front surface of the start paper, the allocated start page S'(m) to be printed by the m-th printer PRTm equals to a value obtained by multiplying the sum total of papers used by the first through (m−1)th printers by 2 and adding 1 to the result. Therefore, considering whether or not there is execution of printing of the start page on the front surface of the start paper, the allocated start page S'(m) to be printed by the m-th printer PRTm is represented by formula (8).

$$S'(1) = 1 \quad (8)$$
$$S''(m) = 2 \cdot \sum_{i=1}^{m-1} Pv(i) + 1 - b(2 \le m \le n)$$

In this example, S'(1)=1, S'(2)=6, S'(3)=12, and S'(4)=16 are found.

Also, assuming that the start page is printed on the front surface of the start paper, the allocated end page E' (m) to be printed by the m-th printer PRTm equals to a value obtained by multiplying the sum total of papers used by the first through m-th printers by 2. Therefore, considering whether or not there is execution of printing of the start page on the front surface of the start paper, the allocated end page E'(m) to be printed by the m-th printer PRTm is represented by formula (9).

$$E'(m) = 2 \cdot \sum_{i=1}^{m} Pv(i) - b(1 \le m < n) \quad (9)$$
$$E'(n) = Q$$

In this example, E'(i)=5, E'(2)=11, E'(3)=15, and E'(4)=19 are found.

At step S114, the distribution processing module 220 modifies the control data CDa and CDb of the original job JB0' stored in the job storage section 226 and generates the distributed jobs JB1'-JB4', and supplies the communication data DT1'-DT4' (FIGS. 12(B)-12(E)) containing jobs JB1'-JB4' to the distribution destination printers PRT1-PRT4, respectively.

As described with the first embodiment (FIGS. 8(A) and 8(B)), because the alignment order of the plurality of page images differs between the first type of print data PDa and the second type of print data PDb, it is necessary to specify the value of the printing start page and the printing end page according to this order.

Therefore, in this example, similar to the first embodiment, the specification values SP and EP contained in the job given to the (2·x−1)th printer and the job given to the (2·x)th printer are respectively represented by formula (10).

$$SP(2 \cdot x - 1) = S'(2 \cdot x - 1)$$

$$EP(2 \cdot x - 1) = E'(2 \cdot x - 1)$$

$$SP(2x) = Q + 1 - E'(2 \cdot x)$$

$$EP(2 \cdot x) = Q + 1 - S'(2 \cdot x) \quad (10)$$

In this example, each of the aforementioned values SP and EP' are found based on formula (10). Then, as shown in FIGS. 12(B)-12(E), the distribution processing module 220 generates the distributed jobs JB1'-JB4' to which the "START PAGE" information and the "END PAGE" information are added.

Also, at step S114, the distribution processing module 220, similar to the first embodiment, generates the distributed jobs JB1'-JB4' for which the "TARGET" information are modified and to which the "PARTNER ADD." information is added.

A-3-4. Distribution Destination Printer Processing

In this example, the processing of each distribution destination printer is performed with the same procedure as shown in FIG. 9. In the case of FIG. 11(B), at step S222, the first distribution destination printer PRT1 can generate the first unexecuted job JB5' using the first distributed job JB1', and can supply the communication data DT6' containing the first unexecuted job JB5' to the second distribution destination printer PRT2. Also, in the case in FIG. 11(C), at step S222, the second distribution destination printer PRT2 can generate the second unexecuted job JB6' using the first unexecuted job JB6, and can supply the communication data DT6' containing the second unexecuted job JB6' to the first distribution destination printer PRT1.

FIGS. 13(A) and 13(B) show the specific contents of the communication data DT6' and DT6' according to the modified example of the first embodiment. FIGS. 13(A) and 13(B) show the communication data DT5' and DT6', respectively.

Figure 12B:
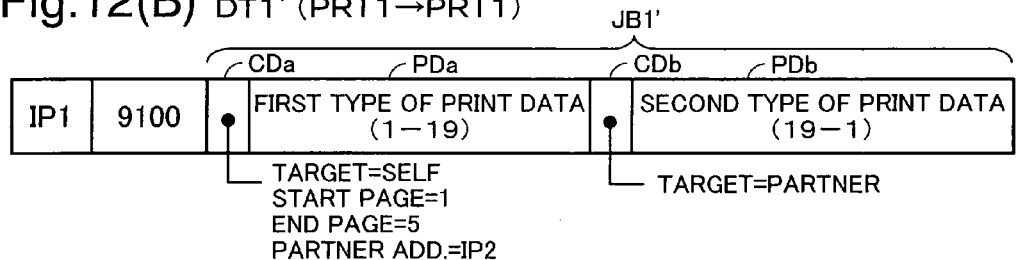
Figure 12C:
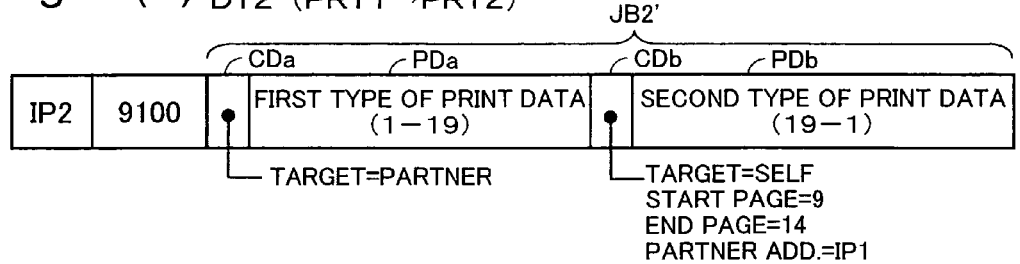
Figure 12D:
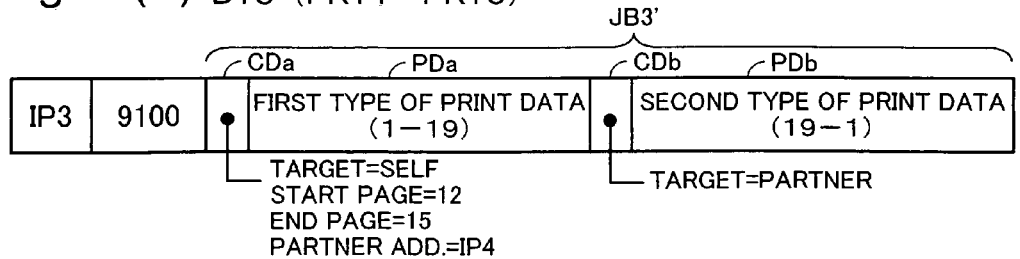
Figure 12E:
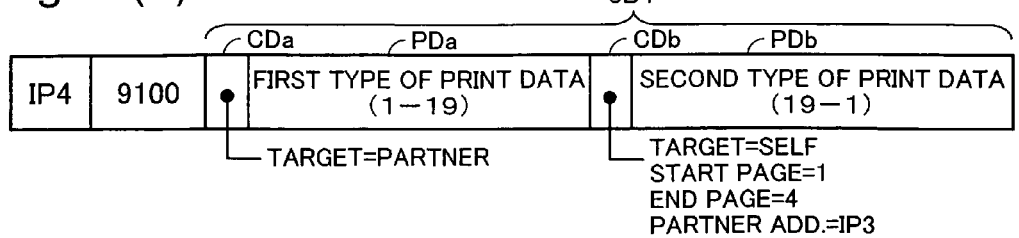

Similar to the first embodiment, the first unexecuted job JB5' shown in FIG. 13(A) is generated by modifying the contents of the first control data CDa and the second control data CDb of the first distributed job JB1' (FIG. 12(B)). Note that FIG. 13(A) is almost the same as FIG. 10(A), but the "START PAGE" information and the "END PAGE" information contained in the second control data CDb are different, and these are set to "START PAGE=15" and "END PAGE=18". As a result, as described with FIG. 11(B), the first unexecuted job JB5' is generated which requires execution of the printing of the unprinted 2nd to 5th pages images (see FIG. 8(B)), and also requires outputting of each printed paper in the second state.

Also, the second unexecuted job JB6' shown in FIG. 13(B) is generated by modifying the contents of the first control data CDa and the second control data CDb of the first unexecuted job JB5' (FIG. 13(A)). Note that FIG. 13(B) is almost the same as FIG. 10(B), but the "START PAGE" information and the "END PAGE" information contained in the second control data CDb are different, and these are set to "START PAGE=2" and "END PAGE=3". As a result, as described with FIG. 11(C), the second unexecuted job JB6' is generates which requires the execution of printing of the unprinted 2nd and 3rd page images (see FIG. 8(A)), and also requires outputting of each printed paper in the first state.

Note that in this example, the case where one page image is printed on each of the front surface and the back surface of the paper is described, but it is also possible that a plurality of page images (e.g. two page images or four page images) may be printed on each of the front surface and the back surface of the paper.

B. Second Embodiment

B-1. Printing Pros Summary

FIGS. 14(A) and 4(B) show summary of the printing process according to the second embodiment. FIGS. 14(A) and 14(B) are similar to FIGS. 5(A) and 5(B). Note that in this embodiment, the process corresponding to FIG. 5(C) is not executed.

In this embodiment, the computer PC generates an original job JB0b that requires execution of printing of 19 page images, and supplies communication data DT0b containing the original job JB0b to the distribution source printer PRT1.

The distribution source printer PRT1 generates mutually different distributed jobs JB1b-JB4b such that the 19 page images are printed by the four distribution destination printers PRT1-PRT4, and supplies communication data DT1b-DT4b containing the distributed jobs JB1b-JB4b to the distribution destination printers PRT1-PRT4, respectively. However, in this embodiment, as is described later, the data structure of each print job is different from that of the first embodiment.

As shown in FIG. 14(A), the distributed jobs JB1b-JB4b, similar to the jobs JB0-JB4 of the first embodiment, require execution of printing of page images, and also require outputting of each printed paper in the first or second state.

In FIG. 14(B), similar to FIG. 5(B), the three printers PRT2-PRT4 complete printing according to the distributed jobs JB2b-JB4b, but the first printer PRT1 does not complete printing according to the distributed job JB1b. Specifically, the first printer PRT1 does not finish printing of the 4th and 5th page images due to lack of paper.

At this time, the first distribution destination printer PRT1, similar to FIG. 5(B), supplies communication data DT5b containing an unexecuted job JB5b to the second distribution destination printer PRT2, and requests the second distribution destination printer PRT2 to execute the printing of the 4th and 5th page images.

With this embodiment as well, if each printer PRT1-PRT4 executes printing according to each distributed job, the user can easily obtain 19 printed papers for which the page continuity is maintained, similar to the first embodiment.

B-2. Communication Data

FIGS. 15(A)-15(E) show the specific contents of the communication data DT0b-DT4b according to the second embodiment. FIGS. 15(A)-15(E) show the communication data DT0b-DT4b, respectively.

As shown in FIGS. 15(A)-15(E), in this embodiment, the print job of the data part includes one set of job data. The one set of job data includes control data CD and first type of print data PD representing a plurality of page images aligned in ascending order.

Each control data includes "SUBMISSION", "TOTAL PAGES", "START PAGE", "END PAGE", "PRINT FACE", and "PARTNER ADD." Information, similar to the first embodiment, and further includes "KEEPJOB" and "PRINT ORDER" information. Note that in FIGS. 15(A)-15(E), the "SUBMISSION" and "TOTAL PAGES" information is shown as only being contained in the original job JB0b (FIG. 15(A)), but it is also similarly contained in distributed jobs JB1b-JB4b (FIGS. 15(B)-15(E)). Also, as shown in FIGS. 15(A)-15(E), the "START PAGE", "END PAGE", and "PARTNER ADD." information is contained only in jobs JB1b-JB4b (FIGS. 15(B)-15(E)). The "KEEPJOB" information and the "PRINT ORDER" information show the following contents.

"KEEP JOB" information: This information indicates the handling of distributed jobs at the distribution destination printers. "KEEPJOB=ON" indicates that even after printing for the print job is completed by the distribution destination printer, that distributed job is to be held, and "KEEPJOB=RECALL" indicates that the distributed job held by the distribution destination printer is to be read.

"PRINT ORDER" information: This information indicates the output sequence of the page images by the distribution destination printer. "PRINT ORDER=ASCENDING" indicates that the plurality of page images are to be output in ascending order, and "PRINT ORDER=DESCENDING" indicates that the plurality of page images are to be output in descending order.

Figure 15A:
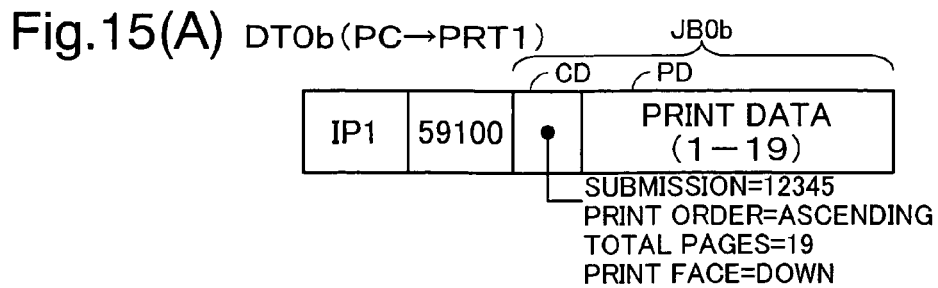
FIGS. 15(A)-15(E) show specific contents of communication data DT0b-DT4b according to the second embodiment.
Figure 15B:
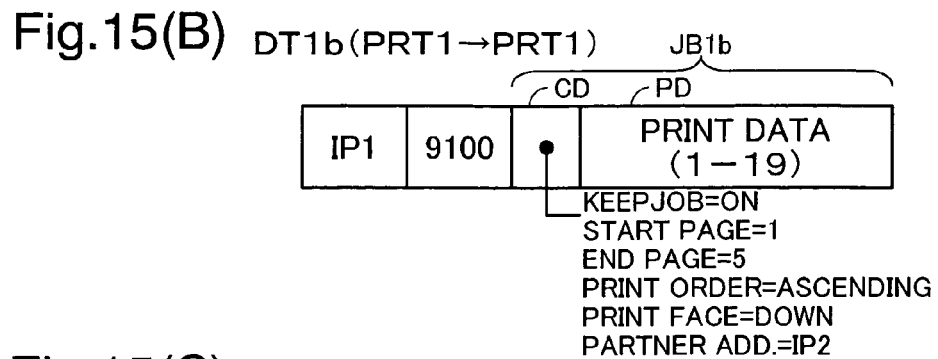
Figure 15C:
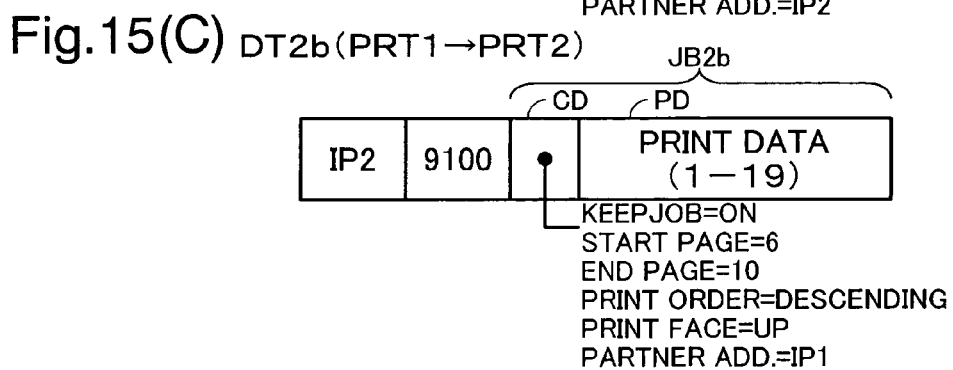
Figure 15D:
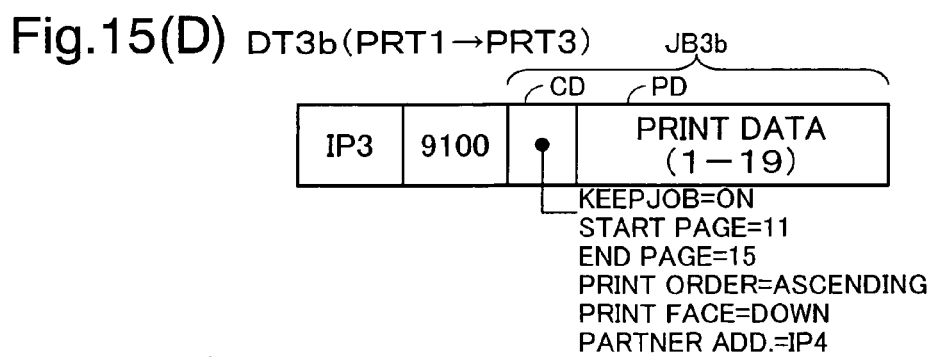

The first and third distribution destination printers PRT1 and PRT3 respectively use the one set of job data contained in the distributed jobs JB1*b* and JB3*b*, shown in FIGS. 15(B) and 15(D). The job data contains the control data CD in which "PRINT FACE=DOWN" and "PRINT ORDER=ASCENDING" are described, and the print data PD representing the plurality of page images aligned in ascending order. As a result, as shown in FIGS. 14(A) and 14(B), the first and third printers PRT1 and PRT3 can output each printed paper in a state (the first state) with the front surface of each printed paper facing downward on the paper ejection tray, and with each printed paper aligned in ascending order.

Figure 15E:
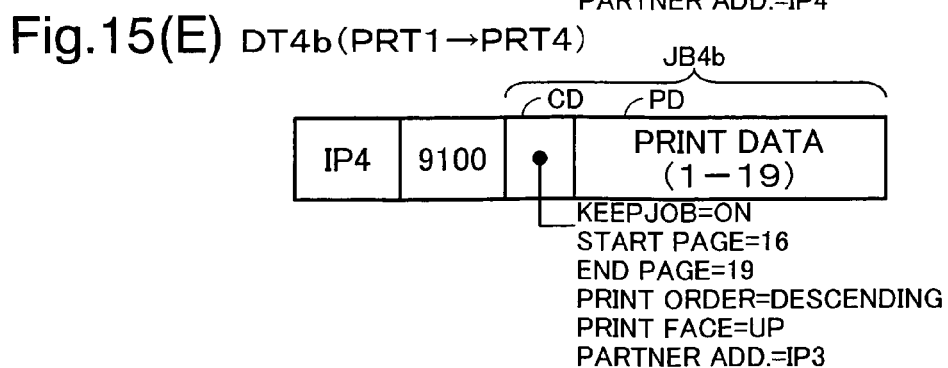

Also, the second and fourth distribution destination printers PRT2 and PRT4 respectively use the one set of job data contained in the distributed jobs JB2*b* and JB4*b*, shown in FIGS. 15(C) and 15(E). The job contains the control data CD in which "PRINT FACE=UP" and "PRINT ORDER=DESCENDING" are described, and the print data PD representing the plurality of page images aligned in ascending order. As a result, as shown in FIGS. 14(A) and 14(B), the second and fourth printers PRT2 and PRT4 can output each printed paper in a state (the second state) with the front surface of each printed paper facing upward on the paper ejection tray, and with each printed paper aligned in descending order.

As described above, in this embodiment, the "PRINT ORDER" information is contained. Because of this, regardless of the fact that only one type of print data PD is used, the first and third printers PRT1 and PRT3 can output printed papers in a state with each printed paper aligned in ascending order, and the second and fourth printers PRT2 and PRT4 can output printed papers in a state with each printed paper aligned in descending order.

Note that the "PRINT ORDER" information of this embodiment corresponds to output order specification information of the present invention.

B-3. Distribution Source Printer Processing

In this embodiment, the distribution source printer processing is executed using the same procedure as in FIG. 7. However, with the change in the data structure of the print job, the specific processing contents of step S114 of FIG. 7 are modified as follows.

At step S114, the distribution processing module 220 modifies the control data CD of the original job JB0*b* stored in the job storage section 226, generates the distributed jobs JB1*b*-JB4*b*, and supplies the communication data DT1*b*-DT4*b* (FIGS. 15(B)-15(E)) containing the jobs JB1*b*-JB4*b* to the distribution destination printer PRT1-PRT4, respectively.

Figure 16:
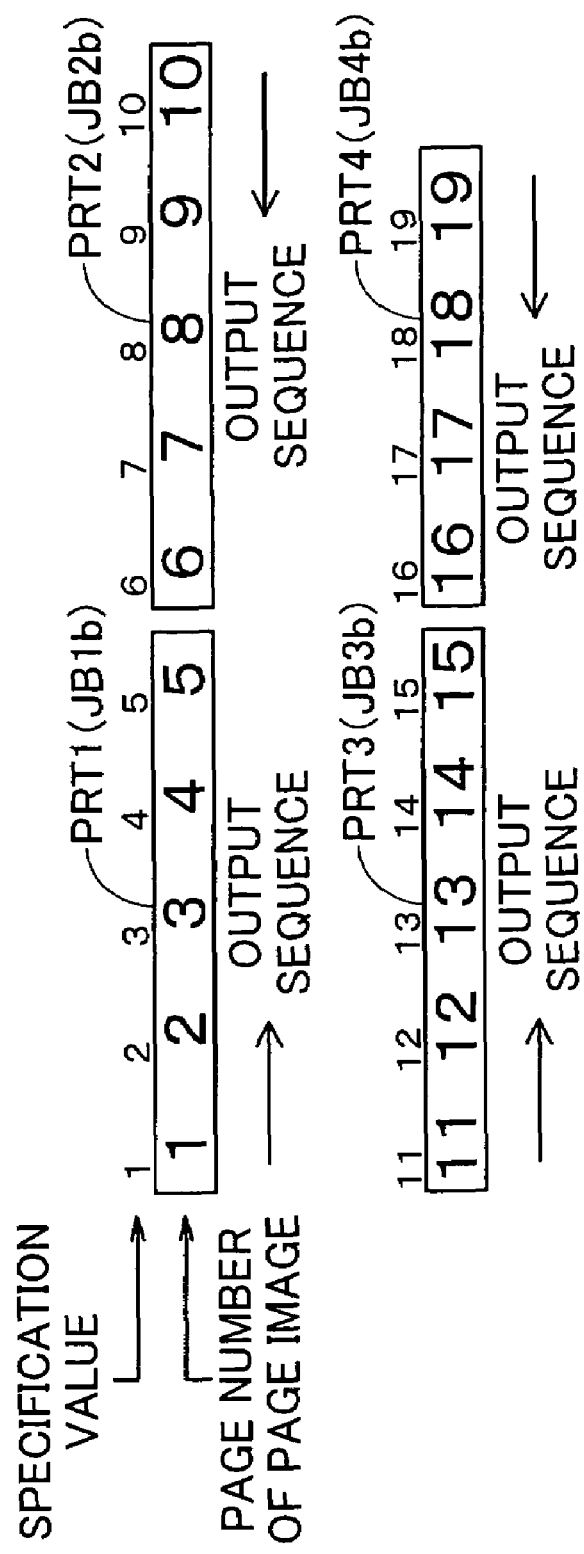
FIG. 16 shows relationship between page numbers and specification values for page images.

In this embodiment, the one type of print data PD in which the plurality of page images are aligned in ascending order is used. FIG. 16 shows the relationship between page numbers and specification values for page images. As shown in the drawing, in this embodiment, a page number (e.g. 5) and a specification value (e.g. 5) for a page image always match. Therefore, in each distributed job JB1*b*-JB4*b*, the same value as the value of the allocated start page S (formula (3)) is included as the specification value SP for the printing start page ("START PAGE" of FIGS. 15(B)-15(E)), and the same value as the value of the allocated end page E (formula (4)) is included as the specification value EP for the printing end page ("END PAGE" of FIGS. 15(B)-15(E)).

Namely, in this embodiment, the specification value SP and EP that should be included in the job given to the (2·x−1)th printer and the job given to the (2·x)th printer are respectively represented by formula (11).

$$SP(2 \cdot x - 1) = S(2 \cdot x - 1)$$

$$EP(2 \cdot x - 1) = E(2 \cdot x - 1)$$

$$SP(2 \cdot x) = S(2 \cdot x)$$

$$EP(2 \cdot x) = E(2 \cdot x) \qquad (11)$$

In this embodiment, the above values SP and EP are obtained based on formula (11). Then, as shown in FIGS. 15(B)-15(E), the distribution processing module 220 generates jobs JB1*b*-JB4*b* to which the "START PAGE" information and the "END PAGE" information are added.

Also, at step S114, the distribution processing module 220 generates the distributed jobs JB1*b*-JB4*b* for which the "PRINT ORDER" information and the "PRINT FACE" information are modified and to which the "KEEPJOB" information and the "PARTNER ADD." information are added.

Specifically, the distribution processing module 220 sets "PRINT ORDER=ASCENDING" and "PRINT FACE=DOWN" for the control data CD of the distributed jobs given to the (2·x−1)th distribution destination printer. Also, the distribution processing module 220 sets "PRINT ORDER=DESCENDING" and "PRINT FACE=UP" for the control data CD of the jobs given to the (2·x)th distribution destination printer.

In this embodiment, as shown in FIGS. 15(B)-15(E), "PRINT ORDER=ASCENDING" and "PRINT FACE=DOWN" are set for the control data CD of the distributed jobs JB1*b* and JB3*b*, and "PRINT ORDER=DESCENDING" and "PRINT FACE=UP" are set for the control data CD of the distributed jobs JB2*b* and JB4*b*.

Further, the distribution processing module 220, similar to the first embodiment, sets the IP address of the partner printer (the other distribution destination printer) constituting the pair as the "PARTNER ADD." information for the control data CD contained in the job given to one of the distribution destination printers constituting the pair. Furthermore, the distribution processing module 220 sets "KEEPJOB=ON" for the control data CD contained in the jobs given to each distribution destination printer.

At step S114, as described above, jobs JB1*b*-JB4*b* (FIGS. 15(B)-15(E)) suited for distribution destination printers are generated, and are supplied to distribution destination printers, respectively.

B-4. Distribution Destination Printer Processing

Figure 17:
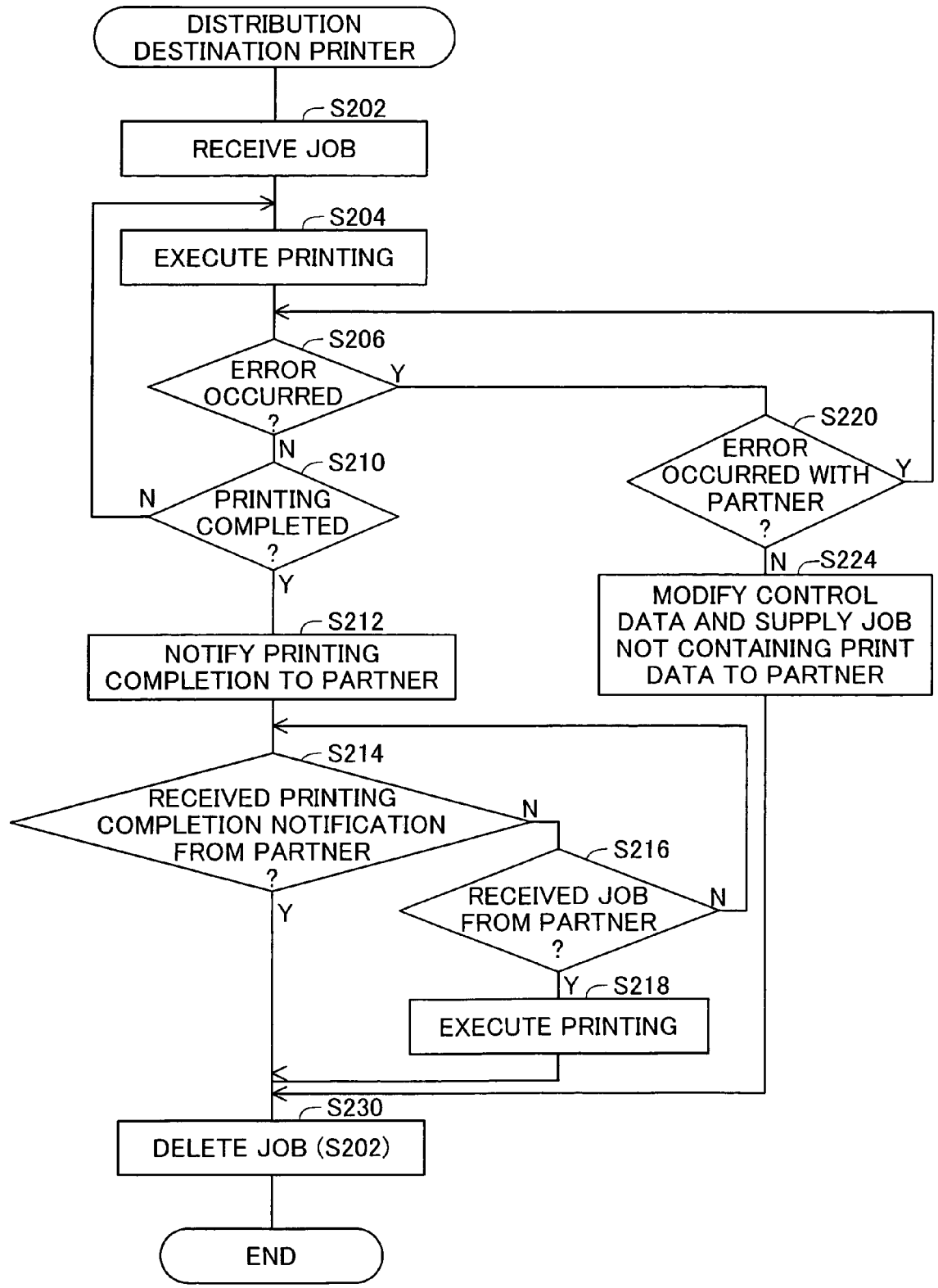
FIG. 17 is a flow chart showing processing contents of the distribution destination printer according to the second embodiment.

FIG. 17 is a flow chart showing the processing contents of the distribution destination printer according to the second embodiment. FIG. 17 is similar to FIG. 9, but instead of step S222 in FIG. 9, step S224 is executed. Also, in FIG. 17, steps S212, S214, S216, and S218 are added.

The process of step S224 is executed if an error has occurred at the distribution destination printer being observed (e.g. PRT1), and an error has not occurred at the other distribution destination printer (e.g. PRT2) which is the partner.

At step S224, the unexecuted job generating module 234 of the distribution destination printer being observed (e.g. PRT1) modifies the control data of the distributed job (e.g.

JB1*b*), generates the unexecuted job (e.g. JB5*b*), and supplies the communication data (e.g. DT5*b*) containing the unexecuted job to the partner printer (e.g. PRT2). Specifically, the unexecuted job generating module 234 receives unprinted page information from the printer controller 260, and also receives only the control data CD contained in the distributed job (e.g. JB1*b*) stored inside the printer buffer 262. Then, the unexecuted job generating module 234 modifies the control data CD of the distributed job and generates the unexecuted job (e.g. JB5*b*) that contains the control data CD but does not contain the print data PD. When supplying of the unexecuted job to the partner printer (e.g. PRT2) is completed, the processing proceeds to step S230, and the distributed job (e.g. JB1*b*) received at step S202 is deleted.

The process of step S212 is executed if printing is completed according to the distributed job (e.g. JB1*b*) by the distribution destination printer being observed (e.g. PRT1) at step S210.

At step S212, the job processing module 230 of the distribution destination printer being observed (e.g. PRT1) notifies the other distribution destination printer (e.g. PRT2) which is the partner, that printing is completed.

At step S214, the distribution destination printer being observed (e.g. PRT1) judges whether or not notification for completion of printing has been received from the partner printer (e.g. PRT2). If printing completion notification has been received from the partner printer, the processing proceeds to step S230, and the distributed job (e.g. JB1*b*) received at step S202 is deleted. On the other hand, if the printing completion notification has not been received from the partner printer, the processing proceeds to step S216.

At step S216, the job processing module 230 of the distribution destination printer being observed (e.g. PRT1) judges whether or not the unexecuted job has been received from the partner printer (e.g. PRT2). If the unexecuted job has been received from the partner printer, the processing proceeds to step S218. On the other hand, if the unexecuted job has not been received from the partner printer, the processing returns to step S214.

At step S218, the printer engine 270 of the distribution destination printer being observed (e.g. PRT1) executes printing according to the unexecuted job received from the partner printer (e.g. PRT1). However, as described with step S224, the unexecuted job contains the control data CD but does not contain the print data PD. Because of this, the printer controller 260 of the distribution destination printer being observed cause the printer engine 270 to execute printing, using the unexecuted job (control data CD) received from the job processing module 230 and the distributed job (e.g. JB1*b*) saved in the printer buffer 262. If printing is completed, the processing proceeds to step S230, and the distributed job (e.g. JB1*b*) received at step S202 and the unexecuted job (control data) are deleted.

In this embodiment, as described above, if each distribution destination printer has completed printing according to the distributed job with its own printer, after receiving notification for completion of printing from the partner printer (step S214), or after printing is executed according to the unexecuted job given from the partner printer (step S218), each distribution destination printer deletes the distributed job given to its own printer. Also, each distribution destination printer, if an error has occurred with its own printer, deletes the distributed job given to its own printer after supplying the unexecuted job to the partner printer (step S224).

As can be understood from the description above, in the case shown in FIG. 14(B), at step S224, the first distribution destination printer PRT1 can generate the unexecuted job JB5*b* using the first distributed job JB1*b*, and can supply the unexecuted job JB5*b* to the second distribution destination printer PRT2 which is the partner. Then, at step S216, the second distribution destination printer PRT2 can receive the unexecuted job JB5*b*, and can execute printing according to the unexecuted job JB5*b* at step S218.

However, the unexecuted job JB5*b* does not contain the print data PD. Because of that, if the printer controller 260 of the second distribution destination printer PRT2 receives the unexecuted job JB5*b*, it reads the print data PD of the distributed job JB2*b* held in the printer buffer 262 using the "SUBMISSION" information contained in the unexecuted job JB5*b*. Then, the printer controller 260 executes printing using the control data CD of the unexecuted job JB5*b* and the print data PD of the distributed job JB2*b*.

Figure 18:
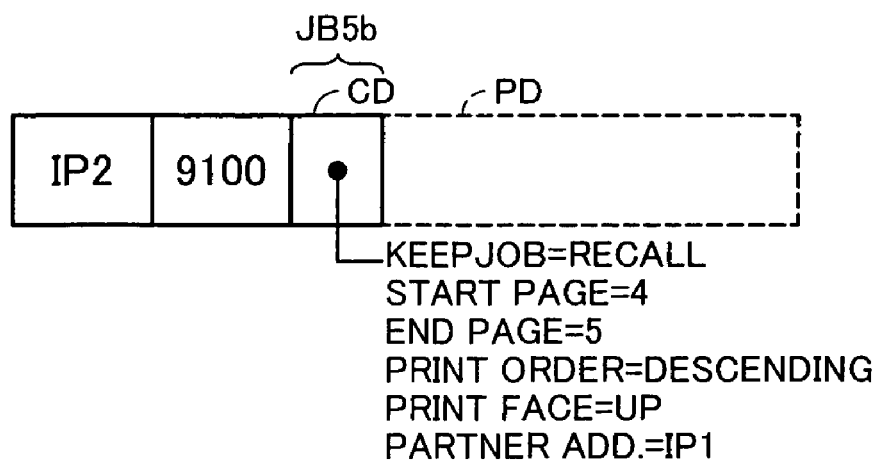
FIG. 18 shows specific contents of communication data DT5b according to the second embodiment.

FIG. 18 shows the specific contents of the communication data DT5*b* according to the second embodiment. As shown in the drawing, the communication data DT5*b* contains the unexecuted job JB5*b*, but the unexecuted job JB5*b* does not contain the print data PD and only contains the control data CD.

As described previously, the unexecuted job JB5*b* of FIG. 18 is generated by modifying the contents of the control data CD of the first distributed job JB1*b* (FIG. 15(B)). Specifically, the unexecuted job generating module 234 of the first distribution destination printer PRT1 changes "KEEPJOB=ON", "PRINT ORDER=ASCENDING", "PRINT FACE=DOWN", and "PARTNERADRESS=IP2" of the control data CD of the first distribute job JB1*b* (FIG. 15(B)) respectively to "KEEEPJOB=RECALL", "PRINT ORDER=DESCENDING", "PRINT FACE=UP", and "PARTNERADRESS=IP1", and "START PAGE=4" and "END PAGE=5" are added. As a result, as described with FIG. 14(B), the unexecuted job JB5*b* is generated which requires execution of printing of the unprinted 4th and 5th page images (see FIG. 16) and also requires outputting of each printed paper in the second state. Note that the specification value of the unprinted page is set according to formula (11).

Note that in this embodiment as well as described with the modified example of the first embodiment, the control data may include "DX" information relating to both surface printing and "FC" information relating to the front surface of the start paper.

As described above, in this embodiment, similar to the first embodiment, if the first distribution destination printer cannot continue printing according to the first distributed job JB1*b*, it is possible to have the unexecuted job JB5*b* executed on the second distribution destination printer PRT2 without using the distribution processing module 220 having a function as a server.

In particular, in this embodiment, with each distribution destination printer, even if printing is completed according to the given distributed job, the distributed job is saved when the printing of the other distribution destination printer which is the partner is not completed. As a result, in this embodiment, it is sufficient for the first distribution destination printer PRT1 to supply the unexecuted job JB5*b* that does not contain the print data PD to the second distribution destination printer PRT2, and it is possible to significantly reduce the size of the unexecuted job JB5*b*.

The invention is not limited to the above examples and embodiments set forth hereinabove, and can be reduced to practice in various ways without departing from the spirit thereof, such as the following variations, for example.

(1) In the first embodiment, the print job containing two control data CDa and CDb and two types of print data PDa and PDb is used, but instead of this, a print job that contains one control data and two types of print data may be used. In this case, if the first distribution destination printer cannot continue printing, the first distribution destination printer, similar to the second embodiment, may modify the one control data contained in a distributed job, and generate an unexecuted job containing the one control data and the two types of print data. Note that in this case, in the one control data may contain, instead of the "TARGET" information, different print data specification information indicating one of two print data to be used by the distribution destination printer.

(2) In the first embodiment, the print job containing two types of print data PDa and PDb is used, but instead of this, similar to the second embodiment, a print job containing one type of print data may be used. Also, in this case, an unexecuted print job containing control data and one type of print data may be used.

Also, in the second embodiment, the print job containing one type of print data are used, but instead of this, similar to the first embodiment, a print job containing two types of print data may be used. Also, in this case, an unexecuted job containing only control data without containing two types of print data may be used.

(3) In the first embodiment, each distributed job contains the same print data PDa and PDb, and in the second embodiment, each distributed job contains the same print data PD, but instead of this, each distributed job may contain different print data.

For example, the computer PC may supplies an original job containing the first type of print data representing the plurality of page images aligned in ascending order to the distribution source printer. The distribution source printer generates the second type of print data representing the plurality of page images aligned in descending order based on the first type of print data. Then, the distribution source printer supplies a distributed job containing the first type of print data to the (2·x−1)th distribution destination printer, and supplies a distributed job containing the second type of print data to the (2·x)th distribution destination printer. In this case as well, the (2·x−1)th distribution destination printer can execute printing in ascending order using the first type of print data, and the (2·x)th distribution destination printer can execute printing in descending order using the second type of print data.

Further, if the first distribution destination printer cannot continue printing, the first distribution destination printer generates the second type of print data based on the first type of print data contained in the distributed job, and can supply an unexecuted job containing this second type of print data to the second distribution destination printer.

(4) In the above embodiments, the original job requiring execution of printing of a plurality of pages is distributed to a plurality of distribution destination printers in page units. However, instead of this, an original job requiring execution of printing of a plurality of copies may be distributed to a plurality of distribution destination printers in copy count units. In this case, if the first distribution destination printer cannot continue printing, the first distribution destination printer may supply an unexecuted job requiring printing of unexecuted copy count, among a plurality of copies required to be executed printing by a distributed job, to the second distribution destination printer.

Further, in the above embodiments, two distribution destination printers constitute one group (pair), but instead of this, three or more distribution destination printers may constitute one group. However, in the case where two distribution destination printers constitute one group (pair), as with the above embodiments, even if distributed jobs are generated in page units and unexecuted jobs requiring printing of unprinted pages are issued, there is the advantage that each printed medium can be output with the page continuity maintained.

In General, if the first distribution destination printer cannot continue printing according to the first distributed job, the unexecuted job generating module of the first distribution destination printer will generate the first unexecuted print job that is a job for unexecuted of the first distributed job, and will supply the first unexecuted job to the second distribution destination printer belonging to the same group.

(5) In the above embodiments, the IP address of the partner distribution destination printer is contained in each job supplied to each distribution destination printer, but instead of this, each distribution destination printer may acquire the IP address of the partner printer from the distribution source printer only if an error occurs at its own printer.

In General, the device information acquiring module will acquire, from the distribution source device, device identification information for identifying the second distribution destination printing device belonging to the same group as the first distribution destination printing device among the plurality of distribution destination printing devices.

(6) In the above embodiments, the distribution source printer PRT1 selects a distribution destination printer candidate using the setting file in which the same model type of printer as the distribution source printer is registered. However, instead of this, the distribution source printer may acquire a plurality of distribution destination printer candidates having the same model type name as the distribution source printer from among many printers connected to the network. Note that the SNMP manager module of the distribution source printer may acquire each printer model type name by inquiring of the SNMP agent module of each printer.

Further, in the above embodiments, the same model type of printers as the distribution source printer are registered in the setting file, but instead of this, similar model types of printers may be registered. For example, with upper class models of printers capable of executing color printing and monochromatic printing, and lower class model types of printers for which color printing function is omitted from these upper class model types of printers, normally, the same print data is used when executing monochromatic printing. Therefore, if the lower class model type of printer is selected as the distribution source printer, the lower class model type of printer and the upper class model type of printer may be selected as the distribution destination printer. Namely, a printer capable of executing printing using the same print data may be selected as the distribution destination printer.

(7) Part of the components realized by hardware in the above embodiments may be instead realized by software, and conversely, part of the components realized by software may be instead realized by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A first distribution destination printing device, used for a printing system comprising a distribution source device that executes distribution processing for distributing an original print job and a plurality of distribution destination printing devices that execute printing according to a plurality of distributed print jobs supplied from the distribution source device respectively, the first distribution destination printing device comprising:

a printing execution module that executes printing; and
a print job processing module that acquires a first distributed print job supplied from the distribution source device and gives the first distributed print job to the printing execution module,
wherein the print job processing module comprises:
a device information acquiring module that acquires, from the distribution source device, device identification information for identifying a second distribution destination printing device among the plurality of distribution destination printing devices, the second distribution destination printing device belonging to the same group as the first distribution destination printing device; and
an unexecuted print job generating module that, if the first distribution printing device cannot finish printing the first distributed print job due to an error occurred during the printing execution, generates a first unexecuted print job that is a print job for unexecuted of the first distributed print job, and supplies the first unexecuted print job to the second distribution destination printing device identified by the device identification information.

2. A first distribution destination printing device in accordance with claim 1, wherein if the print job processing module acquires a second unexecuted print job that is a print job for unexecuted of a second distributed print job, the second distributed print job being supplied from the distribution source device to the second distribution destination printing device, the print job processing module gives the second unexecuted print job to the printing execution module.

3. A first distribution destination printing device in accordance with claim 2, wherein
the original print job requires executing of printing of a plurality of pages,
the first distributed print job requires execution of printing of pages of a first part among the plurality of pages,
the second distributed print job requires execution of printing of pages of a second part among the plurality of pages, the second part being different from the first part, and
the first unexecuted print job requires execution of printing of an unprinted page among the pages of the first part.

4. A first distribution destination printing device in accordance with claim 3, wherein
the first distributed print job requires execution of printing of the pages of the first part, and also requires outputting of each printed medium, for which a page of the first part is printed, in a first state in which a predetermined surface of each printed medium faces a first direction and each printed medium is aligned in ascending order,
the second distributed print job requires execution of printing of the pages of the second part subsequent to the pages of the first part, and also requires outputting of each printed medium, for which a page of the second part is printed, in a second state in which a predetermined surface of each printed medium faces a second direction different from the first direction and each printed medium is aligned in descending order, and
the first unexecuted print job requires execution of printing of the unprinted page immediately before the pages of the second part, among the pages of the first part, and also requires outputting of each printed medium, for which the unprinted page is printed, in the second state.

5. A first distribution destination painting device in accordance with claim 4, wherein each of the distributed print jobs includes:
a first type of print data that represents images for the plurality of pages aligned in ascending order;
a second type of print data that represents images for the plurality of pages aligned in descending order; and
print data specification information that indicates one of the two types of print data to be used by each of the distribution destination printing devices,
and wherein the first unexecuted print job is generated by modifying the print data specification information included in the first distributed print job.

6. A first distribution destination printing device in accordance with claim 4, wherein each of the distributed print jobs includes:
print data that represents images for the plurality of pages aligned in a predetermined order; and
output order specification information that indicates an output order of each printed medium printed by each of the distribution destination printing devices,
and wherein the first unexecuted print job is generated by modifying the output order specification information included in the first distributed print job.

7. A first distribution destination printing device in accordance with claim 3,
wherein each of the distributed print jobs includes print data that represents images of the plurality of pages,
wherein the second distributed print job is deleted in the second distribution destination printing device, if the printing according to the second distributed print job is completed,
and wherein the unexecuted print job generating module supplies to the second distribution destination printing device the first unexecuted print job that is generated using the first distributed print job and includes the print data.

8. A first distribution destination printing device in accordance with claim 3,
wherein each of the distributed print jobs includes print data that represents images of the plurality of pages,
wherein the second distributed print job is held in the second distribution destination printing device, until the printing according to the first distributed print job is completed by the first distribution destination printing device,
and wherein the unexecuted print job generating module supplies to the second distribution destination printing device the first unexecuted print job that is generated using the first distributed print job and does not include the print data.

9. A first distribution destination printing device in accordance with claim 1, wherein the device identification information is included in the first distributed print job.

10. A first distribution destination printing device in accordance with claims 1, wherein the group is constituted by the first distribution destination printing device and the second distribution destination printing device.

11. A printing system comprising:
the plurality of distribution destination printing devices that include the first distribution destination printing device in accordance with claim 1, and
the distribution source device.

12. A processing method of a first distribution destination printing device, the first distribution destination printing device being used for a printing system comprising a distribution source device that executes distribution processing for distributing an original print job and a plurality of distribution destination printing devices that execute printing according to a plurality of distributed print jobs supplied from the distribution source device respectively, and including a printing execution module that executes printing, the processing method comprising:

(a) acquiring a first distributed print job supplied from the distribution source device and giving the first distributed print job to the printing execution module;

(b) acquiring, from the distribution source device, device identification information for identifying a second distribution destination printing device among the plurality of distribution destination printing devices, the second distribution destination printing device belonging to the same group as the first distribution destination printing device; and (c) if the first distribution printing device cannot finish printing the first distributed print job due to an error occurred during the printing execution, generating a first unexecuted print job that is a print job for unexecuted of the first distributed print job, and supplying the first unexecuted print job to the second distribution destination printing device identified by the device identification information.

13. A processing method in accordance with claim 12, further comprising, (d) if acquiring a second unexecuted print job that is a print job for unexecuted of a second distributed print job, the second distributed print job being supplied from the distribution source device to the second distribution destination printing device, giving the second unexecuted print job to the printing execution module.

14. A processing method in accordance with claim 13, wherein
the original print job requires executing of printing of a plurality of pages,
the first distributed print job requires execution of printing of pages of a first part among the plurality of pages,
the second distributed print job requires execution of printing of pages of a second part among the plurality of pages, the second part being different from the first part, and
the first unexecuted print job requires execution of printing of an unprinted page among the pages of the first part.

15. A processing method in accordance with claim 14, wherein
the first distributed print job requires execution of printing of the pages of the first part, and also requires outputting of each printed medium, for which a page of the first part is printed, in a first state in which a predetermined surface of each printed medium faces a first direction and each printed medium is aligned in ascending order,
the second distributed print job requires execution of printing of the pages of the second part subsequent to the pages of the first part, and also requires outputting of each printed medium, for which a page of the second part is printed, in a second state in which a predetermined surface of each printed medium faces a second direction different from the fast direction and each printed medium is aligned in descending order, and
the first unexecuted print job requires execution of printing of the unprinted page immediately before the pages of the second part, among the pages of the first part, and also requires outputting of each printed medium, for which the unprinted page is printed, in the second state.

16. A processing method in accordance with claim 15, wherein each of the distributed print jobs includes:
a first type of print data that represents images for the plurality of pages aligned in ascending order;
a second type of print data that represents images for the plurality of pages aligned in descending order; and
print data specification information that indicates one of the two types of print data to be used by each of the distribution destination printing devices,
and wherein the generating the first unexecuted print job comprises modifying the print data specification information included in the first distributed print job so as to generate the first unexecuted print job.

17. A processing method in accordance with claim 15, wherein each of the distributed print jobs includes:
print data that represents images for the plurality of pages aligned in a predetermined order; and
output order specification information that indicates an output order of each printed medium printed by each of the distribution destination printing devices,
and wherein the generating the first unexecuted print job comprises modifying the output order specification information included in the first distributed print job so as to generate the first unexecuted print job.

18. A computer program product for causing a first distribution destination printing device to execute a processing, the first distribution destination printing device being used for a printing system comprising a distribution source device that executes distribution processing for distributing an original print job and a plurality of distribution destination printing devices that execute printing according to a plurality of distributed print jobs supplied from the distribution source device respectively, and including a printing execution module that executes printing, the computer program product comprising:
a computer readable medium; and
a computer program stored on the computer readable medium,
wherein the computer program comprises:
a first program for causing the first distribution destination printing device to acquire a first distributed print job supplied from the distribution source device and give the first distributed print job to the printing execution module;
a second program for causing the first distribution destination printing device to acquire, from the distribution source device, device identification information for identifying a second distribution destination printing device among the plurality of distribution destination printing devices, the second distribution destination printing device belonging to the same group as the first distribution destination printing device; and
a third program for causing the first distribution destination printing device, if the first distribution printing device cannot finish printing the first distributed print job due to an error occurred during the printing execution, to generate a first unexecuted print job that is a print job for unexecuted of the first distributed print job, and supply the first unexecuted print job to the second distribution destination printing device identified by the device identification information.

* * * * *